(12) United States Patent
Desai

(10) Patent No.: US 12,204,488 B2
(45) Date of Patent: Jan. 21, 2025

(54) HIGH PERFORMANCE SOFTMAX FOR LARGE MODELS

(71) Applicant: SambaNova Systems, Inc., Palo Alto, CA (US)

(72) Inventor: Maulik Desai, Cedar Park, TX (US)

(73) Assignee: SambaNova Systems, Inc., Palo Alto, CA (US)

( * ) Notice: Subject to any disclaimer, the term of this patent is extended or adjusted under 35 U.S.C. 154(b) by 53 days.

(21) Appl. No.: 18/202,030

(22) Filed: May 25, 2023

(65) Prior Publication Data

US 2023/0385230 A1    Nov. 30, 2023

Related U.S. Application Data

(60) Provisional application No. 63/345,732, filed on May 25, 2022.

(51) Int. Cl.
| | | |
|---|---|---|
| *G06F 15/76* | (2006.01) |
| *G06F 15/78* | (2006.01) |
| *G06F 17/18* | (2006.01) |
| *G06N 3/02* | (2006.01) |
| *G06N 3/08* | (2023.01) |

(52) U.S. Cl.
CPC .......... *G06F 15/7867* (2013.01); *G06F 17/18* (2013.01); *G06N 3/02* (2013.01); *G06N 3/08* (2013.01)

(58) Field of Classification Search
CPC ....... G06F 15/7867; G06F 17/18; G06N 3/02; G06N 3/08
See application file for complete search history.

(56) References Cited

U.S. PATENT DOCUMENTS

| | | | |
|---|---|---|---|
| 7,567,889 B2 * | 7/2009 | Wismuller | G06F 18/2137 703/2 |
| 2020/0302284 A1 * | 9/2020 | Garcia Garcia | G06N 3/08 |
| 2022/0147821 A1 * | 5/2022 | Nakata | G06N 3/045 |
| 2022/0391696 A1 * | 12/2022 | Sahin | H04L 27/12 |

OTHER PUBLICATIONS

Stevens et al.; Softermax: Hardware/Software Co-Design of an Efficient Softmax for Transformers; IEEE; 2021 (Year: 2021).*
Iwata; Extending the Peak Bandwidth of Parameters for Softmax Selection in Reinforcement Learning; IEEE; 2021 (Year: 2021).*
Vasyltsov et al.; Efficient Softmax Approximation for Deep Neural Networks with Attention Mechanism; 2021 (Year: 2021).*

* cited by examiner

*Primary Examiner* — Corey S Faherty
(74) *Attorney, Agent, or Firm* — Flagship Patents; Sikander M. Khan

(57) ABSTRACT

The softmax operation is pipelined to evenly balanced operations with 2N latency per sharded M dimension of a tensor shaped M*N, resulting in ~1.8× performance gain. As each operation is fragmented, the pipeline does not assume a fixed-cost fill that can performance-wise hurt significantly for small Tensor dimensions. In addition, this innovative design is Place-and-Route (PNR) friendly as well as resource efficient. Moreover, it is easily parallelized without requiring additional support at the subnet level.

15 Claims, 11 Drawing Sheets

700, 710

User Program Statements
```
Linear_Software = torch.nn.linear(K,N)
Relu = torch.nn.relu
Softmax = torch.nn.Softmax(dim=3)
X1 = torch.randn(N, C, M, K)
X2 = %1.to("RDP")
X3 = Linear(X2)
X4 = Relu(X3)
X5 = Softmax(X4)
X6 = X5.to("CPU")
```

750

User Program Computation Graph

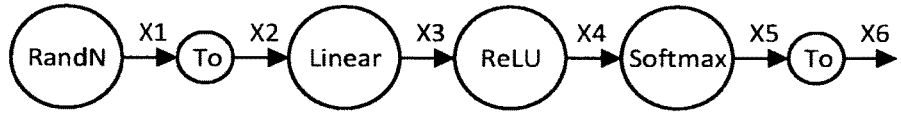

| Air/Tensor Statements | Tensor Size | |
|---|---|---|
| %1 = air.Input(name: "In0"): | NxCxMxK bf16 | |
| %2 = air.Linear(%1): | NxCxMxN bf16 | |
| %3 = air.ReLU(%2): | NxCxMxN bf16 | |
| %4 = air.Exp(%3): | NxCxMxN bf16 | ⎫ |
| %5 = air.Sum(%4, dim: 3): | NxCxMx1 bf16 | ⎬ Softmax lowering |
| %6 = air.Div(%4, %5): | NxCxMxN bf16 | ⎭ |
| %7 = air.Output(%6) | | |

850

Air/Tensor Computation Graph

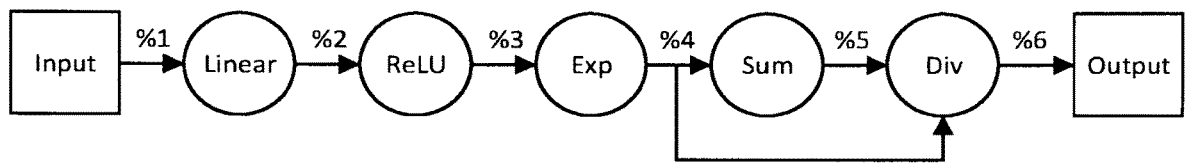

FIG. 8

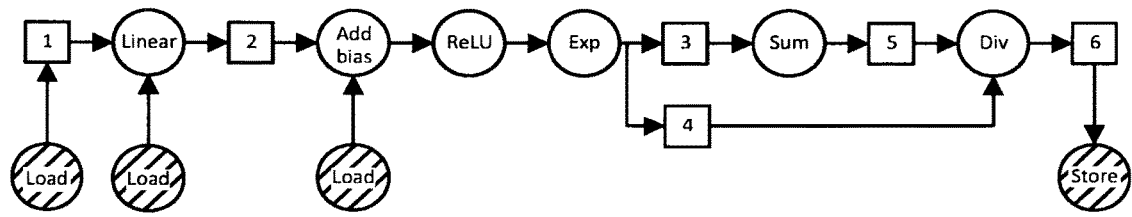
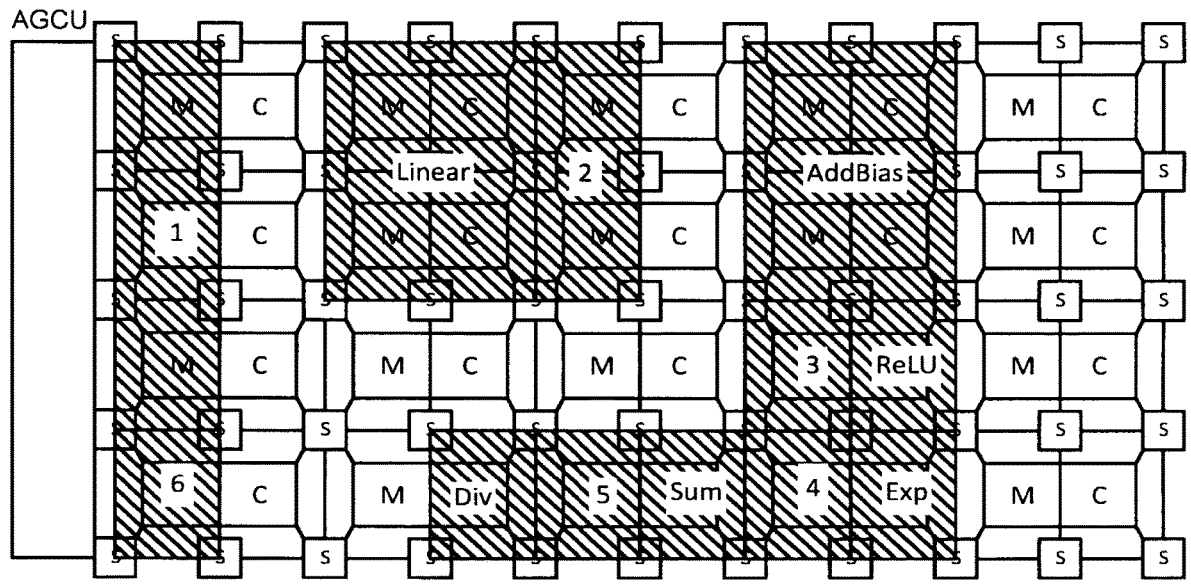
FIG. 11

$$SoftmaxMaxBias(x_i) = \frac{\exp\left(\frac{x_i}{a} - \frac{max(x_j)}{a}\right)}{\sum_j \exp\left(\frac{x_j}{a} - \frac{max(x_j)}{a}\right)}$$

HIGH PERFORMANCE SOFTMAX FOR LARGE MODELS

PRIORITY

This application claims the benefit of and priority to U.S. Provisional Patent Application No.: 63/345,732, titled "HIGH PERFORMANCE SOFTMAX," filed May 25, 2022.

INCORPORATIONS

The following are incorporated by reference for all purposes:
Prabhakar et al., "Plasticine: A Reconfigurable Architecture for Parallel Patterns," ISCA '17, Jun. 24-28, 2017, Toronto, ON, Canada; and
Koeplinger et al., "Spatial: A Language and Compiler for Application Accelerators," Proceedings of the 39th ACM SIGPLAN Conference on Programming Language Design and Implementation (PLDI), Proceedings of the 43rd International Symposium on Computer Architecture, 2018.

BACKGROUND

Technical Field

The technology disclosed relates to executing an interpreted language using hardware that includes a coarse-grained reconfigurable (CGR) processor. In particular, it relates to accelerating a computing graph and increasing its throughput using high performance softmax.

Context

The subject matter discussed in this section should not be assumed to be prior art merely as a result of its mention in this section. Similarly, a problem mentioned in this section or associated with the subject matter provided as background should not be assumed to have been previously recognized in the prior art. The subject matter in this section merely represents different approaches, which in and of themselves can also correspond to implementations of the claimed technology.

Machine learning networks, such as recurrent and convolutional neural networks, can include arrays of computation units analogous to "neurons" arranged in many layers. In some implementations, these computation units can execute functions, such as a sum-of-products, that produce an intermediate value, which is then transformed using an activation function to produce the output of the units. A variety of activation functions have been utilized, including rectified linear unit (ReLU), sigmoid, hyperbolic tangent, softmax, and others. Activation functions can consume a substantial portion of the computational resources of the system.

A softmax function can be implemented using typical arithmetic logic unit (ALU) circuits having adders, multipliers, and dividers, for example. Also, the softmax function can be implemented using a look-up table. However, the ALU and look-up table approach can involve latencies making them unsuitable for some high-performance implementations. Alternatively, the look-up table can be compiled to form a combinational logic circuit to provide the result of the softmax function.

However, such circuits are large and consume significant power at high speeds. As machine learning based technologies are more widely deployed, it is becoming important to implement them at low cost using flexible architectures. In such architectures, including integrated circuit components, area, and power consumption are critical design parameters. One class of integrated circuits includes reconfigurable processors, including field programmable gate arrays (FPGAs), which can be configured to implement a variety of functions more efficiently or faster than might be achieved using a general-purpose processor executing a computer program. So-called coarse-grain reconfigurable architectures (CGRAs) are being developed in which the configurable units in the array are more complex than used in typical, more fine-grained FPGAs, and may enable faster or more efficient execution of various classes of functions. For example, CGRAs have been proposed that can enable implementation of energy-efficient accelerators for machine learning and artificial intelligence workloads. See, Prabhakar, et al., "Plasticine: A Reconfigurable Architecture for Parallel Patterns," ISCA '17, Jun. 24-28, 2017, Toronto, ON, Canada.

It is therefore desirable to reduce the number of computationally expensive hardware operations required for calculating the softmax function, which can be applied as activation functions, including implementations suitable for use in integrated circuits, including as modules in programmable processors such as coarse-grain reconfigurable architecture (CGRA) devices.

A machine learning (ML) model can be represented as a computing graph. An interpreter executing the computing graph may divide the computing graph into sections and map each section to hardware prior to executing each section. With better optimization of ML-graph nodes and computation on larger nodes, normalization nodes, such as softmax appear as bottlenecks to performance. An opportunity arises to provide high performance softmax to accelerate graph execution and improve graph throughput.

SUMMARY

The technology disclosed provides a compiler-infrastructure that supports advanced applications such as training AI models (e.g., GPTs). In this endeavor, softmax operations appear as performance bottlenecks in some applications. Improved pipeline design and careful placement of compute units result in performance and resource efficiencies. Moreover, this design facilitates data splitting into parallel versions for large tensor dimensions.

The softmax operation is pipelined to evenly balanced operations with 2N latency per sharded M dimension of a tensor shaped M*N, resulting in ~1.8× performance gain. As each operation is fragmented, the pipeline does not assume a fixed-cost fill that can performance-wise hurt significantly for small Tensor dimensions. In addition, this innovative design is Place-and-Route (PNR) friendly as well as resource efficient. Moreover, it is easily parallelized without requiring additional support at the subnet level.

Particular aspects of the technology disclosed are described in the claims, specification, and drawings.

BRIEF DESCRIPTION OF THE DRAWINGS

The technology will be described with reference to the drawings, in which:

FIG. 7 shows an example user program in an example first stage of the compiler stack.

FIG. 8 shows the user program in an example second stage of the compiler stack.

FIG. 11 shows the logical computation graph and an example physical layout of the user program.

Figure 1:
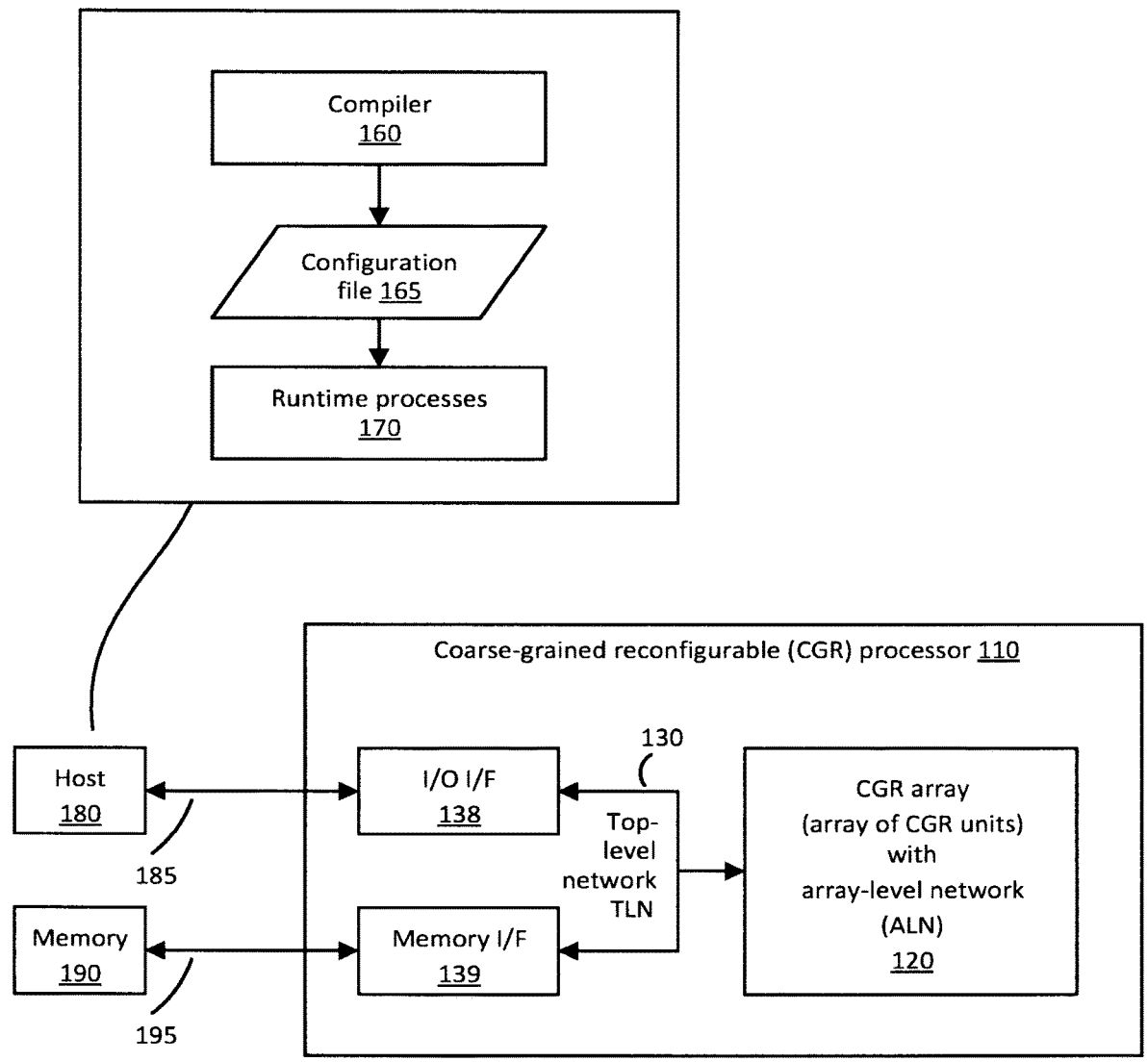
FIG. 1 illustrates an example system including a coarse-grained reconfigurable (CGR) processor, a host, and a memory.

In the figures, like reference numbers may indicate functionally similar elements. The systems and methods illustrated in the figures, and described in the Detailed Description below, may be arranged and designed in a wide variety of different implementations. Neither the figures nor the Detailed Description are intended to limit the scope of the claims. Instead, they merely represent examples of different implementations of the disclosed technology.

DETAILED DESCRIPTION

Traditional compilers translate human-readable computer source code into machine code that can be executed on a Von Neumann computer architecture. In this architecture, a processor serially executes instructions in one or more threads of software code. The architecture is static, and the compiler does not determine how execution of the instructions is pipelined, or which processor or memory takes care of which thread. Thread execution is asynchronous, and safe exchange of data between parallel threads is not supported.

High-level programs for machine learning (ML) and artificial intelligence (AI) may require massively parallel computations, where many parallel and interdependent threads (metapipelines) exchange data. Such programs are ill-suited for execution on Von Neumann computers. They require architectures that are optimized for parallel processing, such as coarse-grained reconfigurable (CGR) architectures (CGRAs) or graphic processing units (GPUs). The ascent of ML, AI, and massively parallel architectures places new requirements on compilers, including how computation graphs, and in particular dataflow graphs, are pipelined, which operations are assigned to which compute units, how data is routed between various compute units and memory, and how synchronization is controlled particularly when a dataflow graph includes one or more nested loops, whose execution time varies dependent on the data being processed.

For languages such as Python, a compiler converts (e.g., compiles) the source code into an intermediate language, called byte code, and then an interpreter executes the byte code in real time. The interpreter basically converts (e.g., interprets), in real time, the byte code into machine code that is executable by the underlying hardware processor(s). Artificial intelligence (AI) models typically create a large amount of Processor Executable Format (PEF) (e.g., byte code), resulting in the compiler and the interpreter taking a large amount of time to process the code.

Neural networks (NNs) generally involve three phases, forward propagation, backward propagation and updates of parameters, typically weights of connections, over time. Forward propagation quantifies neural network behavior, computing the error. Backward propagation uses a form of gradient descent to update new values of weights. Forward propagation is repeated to determine how well these new weights perform followed by backward propagation to update these weights. This process continues until error values reach a minimum. First, calculate the output layer error and pass this result to the hidden layer before it. Similarly, pass the hidden layer error back to its preceding hidden layer. Progressing backwards through the network, every layer calculates the derivative of cost with respect to that layer's weights. This resulting derivative determines the direction for weight adjustment to reduce overall cost. Back-propagation learning does not mandate normalization of input vectors, but normalization improves performance.

Training requires data from a NN forward pass to be saved and made available to the backward pass. Gradients computed are used to update weights. A forward propagation operator has data tensors from earlier inputs, T1 . . . Tn, weights, W1 . . . Wn, biases, filters and output tensor(s), usually single. Some forward operators have their output(s) used by more than one forward operator; each use affects a gradient of the loss with respect to that use. In the associated backward operation, the input is the gradient of the loss with respect to output(s); it is necessary to compute gradients of the loss with respect to T1 . . . Tn, as well as change in all weights W1 . . . Wn, with respect to the change in error. When a forward operation's output is consumed by several other forward operators, each use produces a gradient of loss pertaining to that use. During the backward pass, these gradients are added to create a single gradient of the loss with respect to that output.

Gradient descent finds the local minimum of an error function; it is not guaranteed to find the global minimum. It cannot cross plateaus in the error function landscape caused by non-convexity. However, in practice, this limitation is not a major drawback. It remains a popular and effective optimization method. To improve convergence, several techniques exist, e.g., Momentum, Nesterov accelerated gradient, adaptive learning rate to parameters, and adaptive momentum estimation. If input data is sparse, adaptive learning-rate methods are likely to achieve good results.

Figure 12:
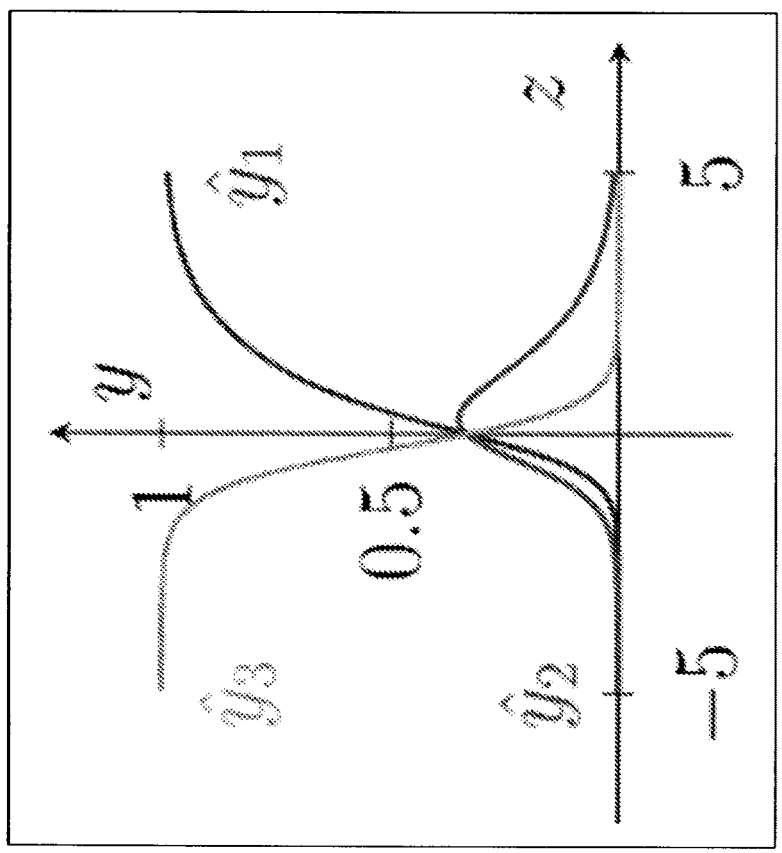
FIG. 12 shows an example softmax function.

Training time for deep NNs is computationally expensive. Normalizing the activities of neurons reduces training time. Normalization is a technique that changes the property of a given distribution and normalization layers accelerate training of a deep neural network (DNN). Batch Normalization (BN) performs standardization using the distribution of the summed input to a neuron over a mini-batch of training cases (FIG. 12). It computes the statistical mean and variance of layers, normalizes layer inputs using batch statistics, i.e., the summed input to a neuron on each training case. The effect of BN depends on the mini-batch size and its application is not clear on RNNs.

During the training stage of NNs, as parameters of preceding layers change, the distribution of inputs to the current layer changes, necessitating constant readjustment to new distributions. Batch normalization achieves NN depth-direction decoupling so that parameter initialization and changes in input distribution of each layer do not affect the learning rate of the network. Essentially, it reduces internal covariate shift, i.e., change in input variable distribution present in training and test data, and smooths the objective function to improve the performance. With this additional layer, the NN enjoys an accelerated learning rate without vanishing or exploding gradients.

Softmax

Softmax function is a preferred function for multi-class classification. The softmax function calculates the probabilities of each target class over all possible target classes. The output range of the softmax function is between zero and one and the sum of all the probabilities is equal to one. The softmax function computes the exponential of the given input value and the sum of exponential values of all the input values. The ratio of the exponential of the input value and the sum of exponential values is the output of the softmax function, referred to herein as "exponential normalization."

Formally, training a so-called softmax classifier is regression to a class probability, rather than a true classifier as it does not return the class but rather a confidence prediction of each class's likelihood. The softmax function takes a class of values and converts them to probabilities that sum to one. The softmax function squashes a n-dimensional vector of arbitrary real values to n-dimensional vector of real values within the range zero to one. Thus, using the softmax function ensures that the output is a valid, exponentially normalized probability mass function (nonnegative and summing to one).

Intuitively, the softmax function is a "soft" version of the maximum function. The term "soft" derives from the fact that the softmax function is continuous and differentiable. Instead of selecting one maximal element, it breaks the vector into parts of a whole with the maximal input element getting a proportionally larger value, and the other getting a less proportion of the value. The property of outputting a probability distribution makes the softmax function suitable for probabilistic interpretation in classification tasks.

Let us consider z as a vector of inputs to the softmax layer. The softmax layer units are the number of nodes in the softmax layer and therefore, the length of the z vector is the number of units in the softmax layer (if we have ten output units, then there are ten z elements).

For an n-dimensional vector $Z=[z_1, z_2, \ldots z_n]$, the softmax function uses exponential normalization (exp) to produce another n-dimensional vector p(Z) with normalized values in the range [0, 1] and that add to unity:

$$Z = \begin{bmatrix} z_1 \\ z_2 \\ \vdots \\ z_n \end{bmatrix} \text{ and }, p(Z) \rightarrow \begin{bmatrix} p_1 \\ p_2 \\ \vdots \\ p_n \end{bmatrix}$$

$$p_j = \frac{\exp^{z_j}}{\sum_{k=1}^{n} \exp^{z_k}} \forall j \in 1, 2, \ldots, n$$

An example softmax function is shown in FIG. 12. Softmax function is applied to three classes as $z \mapsto$ softmax $$\left(\left[z; \frac{z}{10}; -2z\right]\right)$$

Note that the three outputs always sum to one. They thus define a discrete probability mass function.

Elements of the vector p(Z) with normalized values are referred to as normalized output elements $p_n$ of the softmax function, and their transpose is referred to as transpose $p_n^T$ of the vector of the normalized output elements $p_n$.

Softmax function can be used in a final output layer of a neural network or in a hidden layer of the neural network.

Derivative of Softmax

The derivative of a function is the rate of change of one quantity over another. This implies we can measure the rate of change of the output error (loss) with respect to the weights of the neural network. If we know how the error changes with respect to the weights, we can change those weights in a direction that decreases the error.

The partial derivative of a function is the rate of change of one quantity over another, irrespective of another quantity if more than two factors are in the function. Partial derivatives come into play because we train neural networks with gradient descent-based backpropagation, where we deal with multiple variables.

During backpropagation, derivatives of the softmax layer are passed back to the previous/preceding layer. Since the softmax function takes multiple inputs in the form of a vector and produces multiple outputs in the form of an output vector, we need to specify which output component of the softmax function we are seeking to find the derivative of.

The softmax function can be interpreted as $p_i=P(y=i|z)$, where the output class is represented as $y \in 1, \ldots n$ and z is an n-dimensional vector.

The partial derivative of the ith output $p_i$ with respect to the jth input $z_j$ can be represented as $$\frac{\partial p_i}{\partial z_j}.$$

The derivative matrix (which is a Jacobian matrix) of the softmax function can be represented as follows and is depicted as softmax Jacobian matrix:

$$\frac{\partial p}{\partial z} = \begin{bmatrix} \frac{\partial p_1}{\partial z_1} & \frac{\partial p_1}{\partial z_2} & \cdots & \frac{\partial p_1}{\partial z_n} \\ \frac{\partial p_2}{\partial z_1} & \frac{\partial p_2}{\partial z_2} & \cdots & \frac{\partial p_2}{\partial z_n} \\ \vdots & \vdots & \vdots & \vdots \\ \frac{\partial p_n}{\partial z_1} & \frac{\partial p_n}{\partial z_2} & \cdots & \frac{\partial p_n}{\partial z_n} \end{bmatrix}$$

For an arbitrary i and j, the derivative $$\frac{\partial p_i}{\partial z_j}$$

is:

$$\frac{\partial p_i}{\partial z_j} = \frac{\partial \frac{\exp^{z_i}}{\sum_{k=1}^{n} \exp^{z_k}}}{\partial z_j}$$

We know from the partial derivation rule in calculus that if $$f(x) = \frac{g(x)}{h(x)},$$

then:

$$f'(x) = \frac{g'(x)h(x) - h'(x)g(x)}{(h(x))^2}$$

In our case, $$g(x) = \exp^{z_i}, \; h(x) = \sum_{k=1}^{n} \exp^{z_k},$$

$$\frac{\partial h(x)}{\partial (\exp^{z_j})} = \frac{\partial \sum_{k=1}^{n} \exp^{z_k}}{\partial (\exp^{z_j})} = \exp^{z_j} \forall \; j, \text{ and}$$

$$\frac{\partial g(x)}{\partial (\exp^{z_j})} = \frac{\partial (\exp^{z_i})}{\partial (\exp^{z_j})} = (\exp^{z_j})$$

only when i=j.

We therefore have two situations to calculate the derivative.

First, when i=j:

$$\frac{\partial \frac{\exp^{z_i}}{\sum_{k=1}^{n} \exp^{z_k}}}{\partial z} = \frac{\exp^{z_i} \sum_{k=1}^{n} \exp^{z_k} - \exp^{z_j} \exp^{z_i}}{\left(\sum_{k=1}^{n} \exp^{z_k}\right)^2}$$

$$= \frac{\exp^{z_i}}{\sum_{k=1}^{n} \exp^{z_k}} \cdot \frac{\left(\sum_{k=1}^{n} \exp^{z_k}\right) - \exp^{z_j}}{\sum_{k=1}^{n} \exp^{z_k}}$$

$$= \frac{\exp^{z_j}}{\sum_{k=1}^{n} \exp^{z_k}} \cdot \frac{\left(\sum_{k=1}^{n} \exp^{z_k}\right) - \exp^{z_j}}{\sum_{k=1}^{n} \exp^{z_k}}$$

$$= p_i(1 - p_j)$$

Second, when i≠j:

$$\frac{\partial \frac{\exp^{z_i}}{\sum_{k=1}^{n} \exp^{z_k}}}{\partial z_j} = \frac{0 - \exp^{z_j} \exp^{z_i}}{\left(\sum_{k=1}^{n} \exp^{z_k}\right)^2}$$

$$= -\frac{\exp^{z_j}}{\sum_{k=1}^{n} \exp^{z_k}} \cdot \frac{\exp^{z_i}}{\sum_{k=1}^{n} \exp^{z_k}}$$

$$= -p_j p_i$$

To summarize above, the derivative of the softmax function is:

$$\frac{\partial p_i}{\partial z_j} = \begin{cases} p_i(1 - p_j) & \text{if } i = j \\ -p_i p_j & \text{if } i \neq j \end{cases}$$

Terminology

As used herein, the phrase one of should be interpreted to mean exactly one of the listed items. For example, the phrase "one of A, B, and C" should be interpreted to mean any of: only A, only B, or only C.

As used herein, the phrases at least one of and one or more of should be interpreted to mean one or more items. For example, the phrase "at least one of A, B, or C" or the phrase "one or more of A, B, or C" should be interpreted to mean any combination of A, B, and/or C. The phrase "at least one of A, B, and C" means at least one of A and at least one of B and at least one of C.

Unless otherwise specified, the use of ordinal adjectives first, second, third, etc., to describe an object, merely refers to different instances or classes of the object and does not imply any ranking or sequence.

The terms comprising and consisting have different meanings in this patent document. An apparatus, method, or product "comprising" (or "including") certain features means that it includes those features but does not exclude the presence of other features. On the other hand, if the apparatus, method, or product "consists of" certain features, the presence of any additional features is excluded.

The term coupled is used in an operational sense and is not limited to a direct or an indirect coupling. "Coupled to" is generally used in the sense of directly coupled, whereas "coupled with" is generally used in the sense of directly or indirectly coupled. "Coupled" in an electronic system may refer to a configuration that allows a flow of information, signals, data, or physical quantities such as electrons between two elements coupled to or coupled with each other. In some cases, the flow may be unidirectional, in other cases the flow may be bidirectional or multidirectional. Coupling may be galvanic (in this context meaning that a direct electrical connection exists), capacitive, inductive, electromagnetic, optical, or through any other process allowed by physics.

The term connected is used to indicate a direct connection, such as electrical, optical, electromagnetical, or mechanical, between the things that are connected, without any intervening things or devices.

The term configured (to perform a task or tasks) is a broad recitation of structure generally meaning "having circuitry that" performs the task or tasks during operation. As such, the described item can be configured to perform the task even when the unit/circuit/component is not currently on or active. In general, the circuitry that forms the structure corresponding to "configured to" may include hardware circuits, and may further be controlled by switches, fuses, bond wires, metal masks, firmware, and/or software. Similarly, various items may be described as performing a task or tasks, for convenience in the description. Such descriptions should be interpreted as including the phrase "configured to." Reciting an item that is configured to perform one or more tasks is expressly intended not to invoke 35 U.S.C. 112, paragraph (f) interpretation for that unit/circuit/component. More generally, the recitation of any element is expressly intended not to invoke 35 U.S.C. $ 112, paragraph (f) interpretation for that element unless the language "means for" or "step for" is specifically recited.

As used herein, the term based on is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an implementation in which A is determined based solely on B. The phrase "based on" is thus synonymous with the phrase "based at least in part on."

The following terms or acronyms used herein are defined at least in part as follows:

AGCU—address generator (AG) and coalescing unit (CU).
AI—artificial intelligence.
AIR—arithmetic or algebraic intermediate representation.
ALN—array-level network.
Buffer—an intermediate storage of data.
CGR—coarse-grained reconfigurable. A property of, for example, a system, a processor, an architecture (see CGRA), an array, or a unit in an array. This property distinguishes the system, etc., from field-programmable gate arrays (FPGAs), which can implement digital circuits at the gate level and are therefore fine-grained configurable.
CGRA—coarse-grained reconfigurable architecture. A data processor architecture that includes one or more arrays (CGR arrays) of CGR units.
Compiler—a translator that processes statements written in a programming language to machine language instructions for a computer processor. A compiler may include multiple stages to operate in multiple steps. Each stage may create or update an intermediate representation (IR) of the translated statements. Compiler stages are illustrated with reference to FIG. 5.
Computation graph—some algorithms can be represented as computation graphs. As used herein, computation graphs are a type of directed graphs comprising nodes that represent mathematical operations/expressions and edges that indicate dependencies between the operations/expressions. For example, with machine learning (ML) algorithms, input layer nodes assign variables, output layer nodes represent algorithm outcomes, and hidden layer nodes perform operations on the variables. Edges represent data (e.g., scalars, vectors, tensors) flowing between operations. In addition to dependencies, the computation graph reveals which operations and/or expressions can be executed concurrently.
CGR unit—a circuit that can be configured and reconfigured to locally store data (e.g., a memory unit or a PMU), or to execute a programmable function (e.g., a compute unit or a PCU). A CGR unit includes hard-wired functionality that performs a limited number of functions used in computation graphs and dataflow graphs. Further examples of CGR units include a CU and an AG, which may be combined in an AGCU. Some implementations include CGR switches, whereas other implementations may include regular switches.
CU—coalescing unit.
Dataflow Graph—a computation graph that includes one or more loops that may be nested, and wherein nodes can send messages to nodes in earlier layers to control the dataflow between the layers.
Datapath—a collection of functional units that perform data processing operations. The functional units may include memory, multiplexers, ALUs, SIMDs, multipliers, registers, buses, etc.
FCMU—fused compute and memory unit—a circuit that includes both a memory unit and a compute unit.
Graph—a collection of nodes connected by edges. Nodes may represent various kinds of items or operations, dependent on the type of graph. Edges may represent relationships, directions, dependencies, etc.
IC—integrated circuit—a monolithically integrated circuit, i.e., a single semiconductor die which may be delivered as a bare die or as a packaged circuit. For the purposes of this document, the term integrated circuit also includes packaged circuits that include multiple semiconductor dies, stacked dies, or multiple-die substrates. Such constructions are now common in the industry, produced by the same supply chains, and for the average user often indistinguishable from monolithic circuits.
A logical CGR array or logical CGR unit—a CGR array or a CGR unit that is physically realizable, but that may not have been assigned to a physical CGR array or to a physical CGR unit on an IC.
Metapipeline—a subgraph of a computation graph that includes a producer operator providing its output as an input to a consumer operator to form a pipeline. A metapipelines may be nested within another metapipeline, that is, producer operators and consumer operators may include other metapipelines.
ML—machine learning.
PCU—pattern compute unit—a compute unit that can be configured to repetitively perform a sequence of operations.
PEF—processor-executable format—a file format suitable for configuring a configurable data processor.
Pipeline—a staggered flow of operations through a chain of pipeline stages. The operations may be executed in parallel and in a time-sliced fashion. Pipelining increases overall instruction throughput. CGR processors may include pipelines at different levels. For example, a compute unit may include a pipeline at the gate level to enable correct timing of gate-level operations in a synchronous logic implementation of the compute unit, and a metapipeline at the graph execution level (typically a sequence of logical operations that are to be repetitively executed) that enables correct timing and loop control of node-level operations of the configured graph. Gate-level pipelines are usually hard wired and unchangeable, whereas metapipelines are configured at the CGR processor, CGR array level, and/or GCR unit level.
Pipeline Stages—a pipeline is divided into stages that are coupled with one another to form a pipe topology.
PMU—pattern memory unit—a memory unit that can locally store data according to a programmed pattern.
PNR—place and route—the assignment of logical CGR units and associated processing/operations to physical CGR units in an array, and the configuration of communication paths between the physical CGR units.
RAIL—reconfigurable dataflow unit (RDU) abstract intermediate language.
CGR Array—an array of CGR units, coupled with each other through an array-level network (ALN), and coupled with external elements via a top-level network (TLN). A CGR array can physically implement the nodes and edges of a dataflow graph.

SIMD—single-instruction multiple-data—an arithmetic logic unit (ALU) that simultaneously performs a single programmable operation on multiple data elements delivering multiple output results.

TLIR—template library intermediate representation.

TLN—top-level network.

Implementations

The architecture, configurability and dataflow capabilities of an array of CGR units enable increased compute power that supports both parallel and pipelined computation. A CGR processor, which includes one or more CGR arrays (arrays of CGR units), can be programmed to simultaneously execute multiple independent and interdependent dataflow graphs. To enable simultaneous execution, the dataflow graphs may need to be distilled from a high-level program and translated to a configuration file for the CGR processor. A high-level program is source code written in programming languages like Spatial, Python, C++, and C, and may use computation libraries for scientific computing, ML, AI, and the like. The high-level program and referenced libraries can implement computing structures and algorithms of machine learning models like AlexNet, VGG Net, GoogleNet, ResNet, ResNeXt, RCNN, YOLO, SqueezeNet, SegNet, GAN, BERT, ELMo, USE, Transformer, and Transformer-XL.

Translation of high-level programs to executable bit files is performed by a compiler, see, for example, FIGS. 6-11. While traditional compilers sequentially map operations to processor instructions, typically without regard to pipeline utilization and duration (a task usually handled by the hardware), an array of CGR units requires mapping operations to processor instructions in both space (for parallelism) and time (for synchronization of interdependent computation graphs or dataflow graphs). This requirement implies that a compiler for a CGRA must decide which operation of a computation graph or dataflow graph is assigned to which of the CGR units, and how both data and, related to the support of dataflow graphs, control information flows among CGR units, and to and from external hosts and storage. This process, known as "place and route", is one of many new challenges posed to compilers for arrays of CGR units.

FIG. 1 illustrates an example system 100 including a CGR processor 110, a host 180, and a memory 190. CGR processor 110 has a coarse-grained reconfigurable architecture (CGRA) and includes an array of CGR units 120 such as a CGR array. CGR processor 110 further includes an IO interface 138, and a memory interface 139. Array of CGR units 120 is coupled with IO interface 138 and memory interface 139 via databus 130 which may be part of a top-level network (TLN). Host 180 communicates with IO interface 138 via system databus 185, and memory interface 139 communicates with memory 190 via memory bus 195. Array of CGR units 120 may further include compute units and memory units that are connected with an array-level network (ALN) to provide the circuitry for execution of a computation graph or a dataflow graph that may have been derived from a high-level program with user algorithms and functions. The high-level program may include a set of procedures, such as learning or inferencing in an AI or ML system. More specifically, the high-level program may include applications, graphs, application graphs, user applications, computation graphs, control flow graphs, dataflow graphs, models, deep learning applications, deep learning neural networks, programs, program images, jobs, tasks and/or any other procedures and functions that may need serial and/or parallel processing. In some implementations, execution of the graph(s) may involve using multiple units of CGR processor 110. In some implementations, CGR processor 110 may include one or more ICs. In other implementations, a single IC may span multiple CGR processors. In further implementations, CGR processor 110 may include one or more units of array of CGR units 120.

Host 180 may be, or include, a computer such as further described with reference to FIG. 2. Host 180 runs runtime processes, as further referenced herein, and may also be used to run computer programs, such as the compiler 160 further described herein with reference to FIG. 12. In some implementations, the compiler may run on a computer that is similar to the computer described with reference to FIG. 2, but separate from host 180.

CGR processor 110 may accomplish computational tasks by executing a configuration file 165 (for example, a PEF file). For the purposes of this description, a configuration file corresponds to a dataflow graph, or a translation of a dataflow graph, and may further include initialization data. A compiler 160 compiles the high-level program to provide the configuration file 165. Runtime processes 170 may install the configuration file 165 in CGR processor 110. In some implementations described herein, a CGR array is configured by programming one or more configuration stores with all or parts of the configuration file 165. A single configuration store may be at the level of the CGR processor 110 or the CGR array 120, or a CGR unit may include an individual configuration store. The configuration file 165 may include configuration data for the CGR array 120 and CGR units in the CGR array 120, and link the computation graph to the CGR array 120. Execution of the configuration file by CGR processor 110 causes the CGR array 120 to implement the user algorithms and functions in the dataflow graph.

CGR processor 110 can be implemented on a single integrated circuit die or on a multichip module (MCM). An IC can be packaged in a single chip module or a multichip module. An MCM is an electronic package that may comprise multiple IC dies and other devices, assembled into a single module as if it were a single device. The various dies of an MCM may be mounted on a substrate, and the bare dies of the substrate are electrically coupled to the surface or to each other using for some examples, wire bonding, tape bonding or flip-chip bonding.

Figure 2:
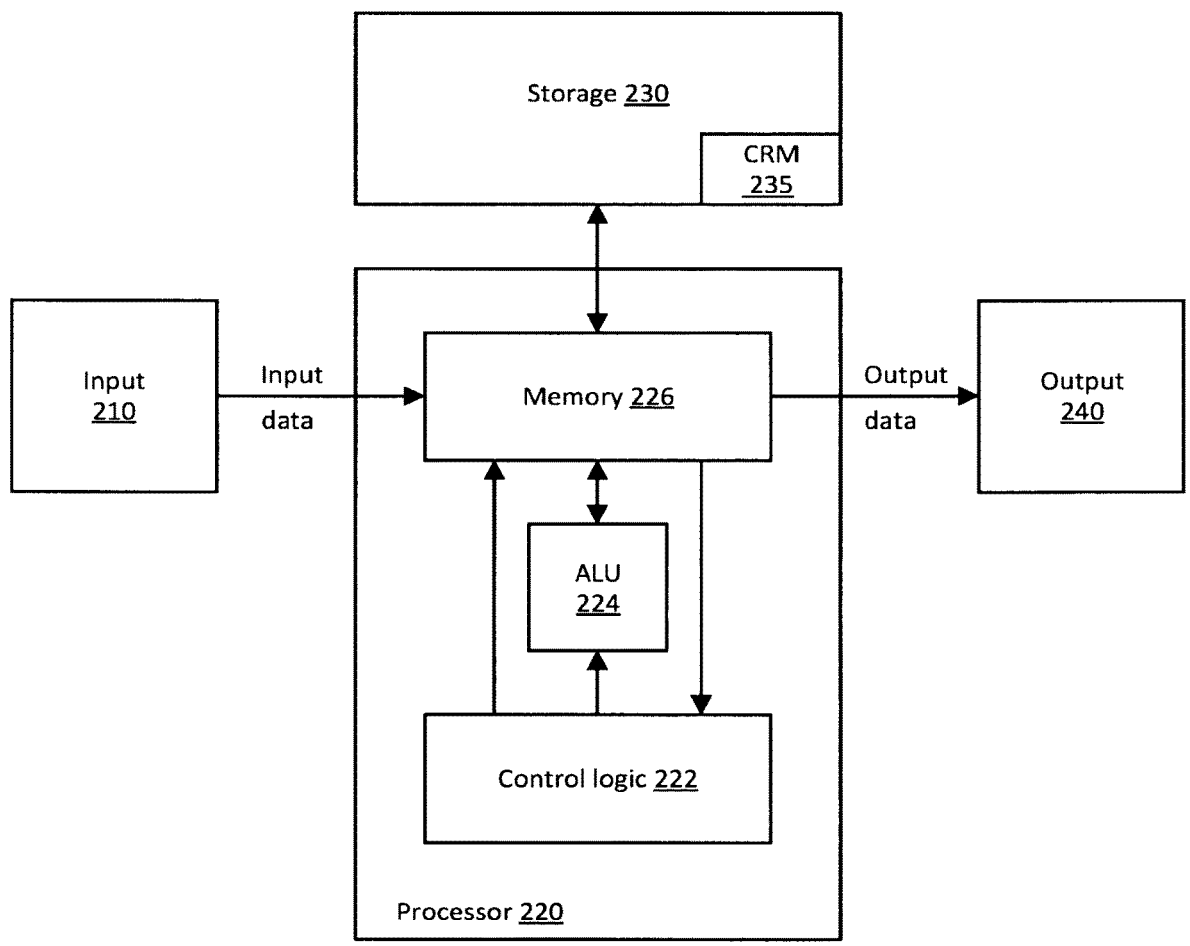
FIG. 2 illustrates an example of a computer, including an input device, a processor, a storage device, and an output device.

FIG. 2 illustrates an example of a computer 200, including an input device 210, a processor 220, a storage device 230, and an output device 240. Although the example computer 200 is drawn with a single processor, other implementations may have multiple processors. Input device 210 may comprise a mouse, a keyboard, a sensor, an input port (for example, a universal serial bus (USB) port), and any other input device known in the art. Output device 240 may comprise a monitor, printer, and any other output device known in the art. Furthermore, part or all of input device 210 and output device 240 may be combined in a network interface, such as a Peripheral Component Interconnect Express (PCIe) interface suitable for communicating with CGR processor 110. Input device 210 is coupled with processor 220 to provide input data, which an implementation may store in memory 226. Processor 220 is coupled with output device 240 to provide output data from memory 226 to output device 240. Processor 220 further includes control logic 222, operable to control memory 226 and arithmetic and logic unit (ALU) 224, and to receive program and configuration data from memory 226. Control logic 222 further controls exchange of data between memory 226 and storage device 230. Memory 226 typically comprises memory with fast access, such as static random-access memory (SRAM), whereas storage device 230 typically comprises memory with slow access, such as dynamic random-access memory (DRAM), flash memory, magnetic disks, optical disks, and any other memory type known in the art. At least a part of the memory in storage device 230 includes a non-transitory computer-readable medium (CRM 235), such as used for storing computer programs.

Figure 3:
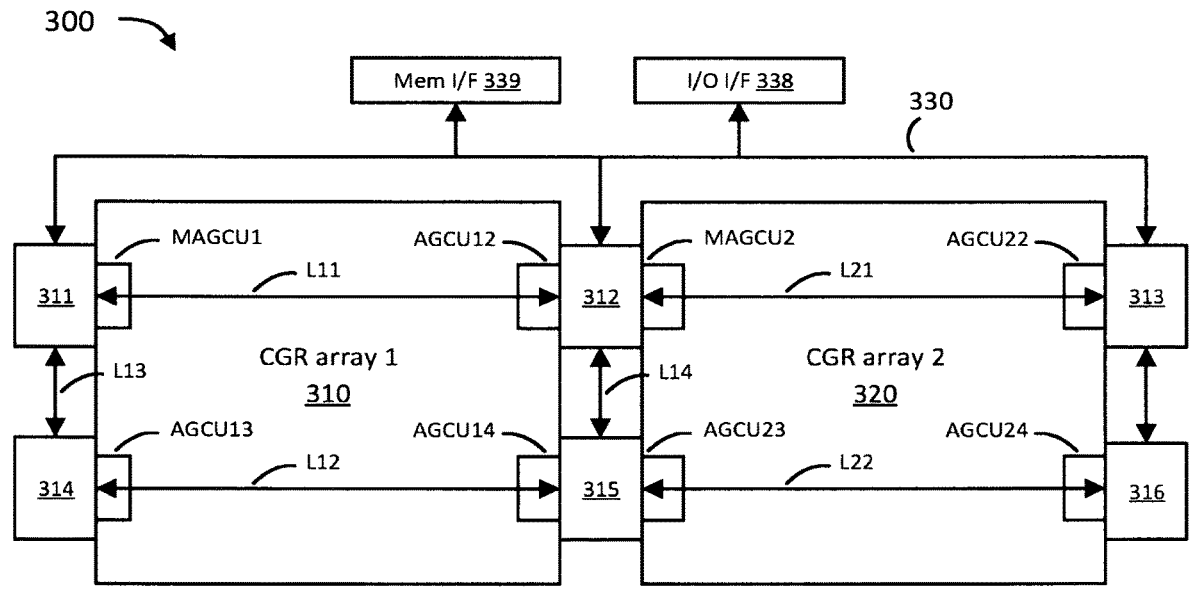
FIG. 3 illustrates example details of a CGR architecture including a top-level network (TLN) and two CGR arrays.

FIG. 3 illustrates example details of a CGR architecture 300 including a top-level network (TLN 330) and two CGR arrays (CGR array 310 and CGR array 320). A CGR array comprises an array of CGR units (e.g., PMUs, PCUs, FCMUs) coupled via an array-level network (ALN), e.g., a bus system. The ALN is coupled with the TLN 330 through several AGCUs, and consequently with I/O interface 338 (or any number of interfaces) and memory interface 339. Other implementations may use different bus or communication architectures.

Circuits on the TLN in this example include one or more external I/O interfaces, including I/O interface 338 and memory interface 339. The interfaces to external devices include circuits for routing data among circuits coupled with the TLN and external devices, such as high-capacity memory, host processors, other CGR processors, FPGA devices, and so on, that are coupled with the interfaces.

Each depicted CGR array has four AGCUs (e.g., MAGCU1, AGCU12, AGCU13, and AGCU14 in CGR array 310). The AGCUs interface the TLN to the ALNs and route data from the TLN to the ALN or vice versa. Other implementations may have different numbers of AGCUs.

One of the AGCUs in each CGR array in this example is configured to be a master AGCU (MAGCU), which includes an array configuration load/unload controller for the CGR array. The MAGCU1 includes a configuration load/unload controller for CGR array 310, and MAGCU2 includes a configuration load/unload controller for CGR array 320. Some implementations may include more than one array configuration load/unload controller. In other implementations, an array configuration load/unload controller may be implemented by logic distributed among more than one AGCU. In yet other implementations, a configuration load/unload controller can be designed for loading and unloading configuration of more than one CGR array. In further implementations, more than one configuration controller can be designed for configuration of a single CGR array. Also, the configuration load/unload controller can be implemented in other portions of the system, including as a stand-alone circuit on the TLN and the ALN or ALNs.

The TLN is constructed using top-level switches (switch 311, switch 312, switch 313, switch 314, switch 315, and switch 316) coupled with each other as well as with other circuits on the TLN, including the AGCUs, and external I/O interface 338. The TLN includes links (e.g., L11, L12, L21, L22) coupling the top-level switches. Data may travel in packets between the top-level switches on the links, and from the switches to the circuits on the network coupled with the switches. For example, switch 311 and switch 312 are coupled by link L11, switch 314 and switch 315 are coupled by link L12, switch 311 and switch 314 are coupled by link L13, and switch 312 and switch 313 are coupled by link L21. The links can include one or more buses and supporting control lines, including for example a chunk-wide bus (vector bus). For example, the top-level network can include data, request and response channels operable in coordination for transfer of data in any manner known in the art.

Figure 4:
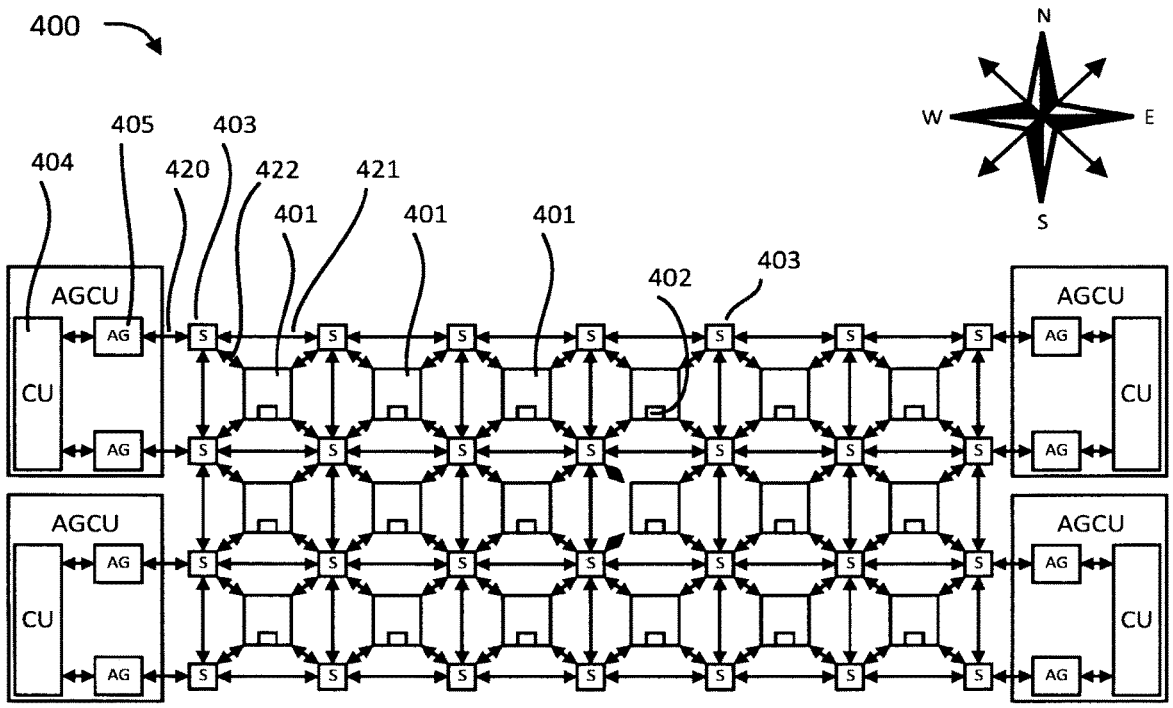
FIG. 4 illustrates an example CGR array, including an array of CGR units in an array-level network (ALN).

FIG. 4 illustrates an example CGR array 400, including an array of CGR units in an ALN. CGR array 400 may include several types of CGR unit 401, such as FCMUs, PMUs, PCUs, memory units, and/or compute units. For examples of the functions of these types of CGR units, see Prabhakar et al., "Plasticine: A Reconfigurable Architecture for Parallel Patterns", ISCA 2017, Jun. 24-28, 2017, Toronto, ON, Canada. Each of the CGR units may include a configuration store 402 comprising a set of registers or flip-flops storing configuration data that represents the setup and/or the sequence to run a program, and that can include the number of nested loops, the limits of each loop iterator, the instructions to be executed for each stage, the source of operands, and the network parameters for the input and output interfaces. In some implementations, each CGR unit 401 comprises an FCMU. In other implementations, the array comprises both PMUs and PCUs, or memory units and compute units, arranged in a checkerboard pattern. In yet other implementations, CGR units may be arranged in different patterns. The ALN includes switch units 403 (S), and AGCUs (each including two address generators 405 (AG) and a shared coalescing unit 404 (CU)). Switch units 403 are connected among themselves via interconnects 421 and to a CGR unit 401 with interconnects 422. Switch units 403 may be coupled with address generators 405 via interconnects 420. In some implementations, communication channels can be configured as end-to-end connections, and switch units 403 are CGR units. In other implementations, switches route data via the available links based on address information in packet headers, and communication channels establish as and when needed.

A configuration file may include configuration data representing an initial configuration, or starting state, of each of the CGR units that execute a high-level program with user algorithms and functions. Program load is the process of setting up the configuration stores in the CGR array based on the configuration data to allow the CGR units to execute the high-level program. Program load may also require loading memory units and/or PMUs.

The ALN includes one or more kinds of physical data buses, for example a chunk-level vector bus (e.g., 512 bits of data), a word-level scalar bus (e.g., 32 bits of data), and a control bus. For instance, interconnects 421 between two switches may include a vector bus interconnect with a bus width of 512 bits, and a scalar bus interconnect with a bus width of 32 bits. A control bus can comprise a configurable interconnect that carries multiple control bits on signal routes designated by configuration bits in the CGR array's configuration file. The control bus can comprise physical lines separate from the data buses in some implementations. In other implementations, the control bus can be implemented using the same physical lines with a separate protocol or in a time-sharing procedure.

Physical data buses may differ in the granularity of data being transferred. In one implementation, a vector bus can carry a chunk that includes 16 channels of 32-bit floating-point data or 32 channels of 16-bit floating-point data (i.e., 512 bits) of data as its payload. A scalar bus can have a 32-bit payload and carry scalar operands or control information. The control bus can carry control handshakes such as tokens and other signals. The vector and scalar buses can be packet-switched, including headers that indicate a destination of each packet and other information such as sequence numbers that can be used to reassemble a file when the packets are received out of order. Each packet header can contain a destination identifier that identifies the geographical coordinates of the destination switch unit (e.g., the row and column in the array), and an interface identifier that identifies the interface on the destination switch (e.g., North, South, East, West, etc.) used to reach the destination unit.

A CGR unit 401 may have four ports (as drawn) to interface with switch units 403, or any other number of ports suitable for an ALN. Each port may be suitable for receiving and transmitting data, or a port may be suitable for only receiving or only transmitting data.

A switch unit, as shown in the example of FIG. 4, may have eight interfaces. The North, South, East and West interfaces of a switch unit may be used for links between switch units using interconnects 421. The Northeast, Southeast, Northwest and Southwest interfaces of a switch unit may each be used to make a link with an FCMU, PCU or PMU instance using one of the interconnects 422. Two switch units in each CGR array quadrant have links to an AGCU using interconnects 420. The AGCU coalescing unit arbitrates between the AGs and processes memory requests. Each of the eight interfaces of a switch unit can include a vector interface, a scalar interface, and a control interface to communicate with the vector network, the scalar network, and the control network. In other implementations, a switch unit may have any number of interfaces.

During execution of a graph or subgraph in a CGR array after configuration, data can be sent via one or more switch units and one or more links between the switch units to the CGR units using the vector bus and vector interface(s) of the one or more switch units on the ALN. A CGR array may comprise at least a part of CGR array 400, and any number of other CGR arrays coupled with CGR array 400.

A data processing operation implemented by CGR array configuration may comprise multiple graphs or subgraphs specifying data processing operations that are distributed among and executed by corresponding CGR units (e.g., FCMUs, PMUs, PCUs, AGs, and CUs).

Figure 5:
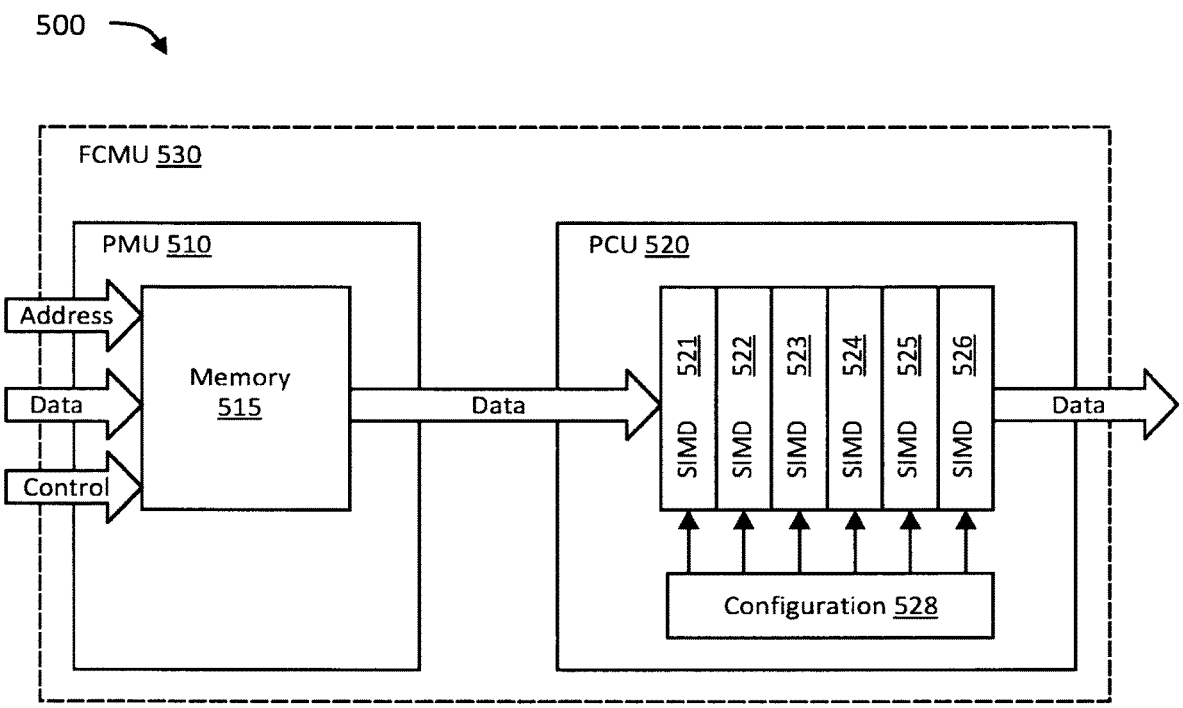
FIG. 5 illustrates an example of a pattern memory unit (PMU) and a pattern compute unit (PCU), which may be combined in a fused-control memory unit (FCMU).

FIG. 5 illustrates an example 500 of a PMU 510 and a PCU 520, which may be combined in an FCMU 530. PMU 510 may be directly coupled to PCU 520, or optionally via one or more switches. PMU 510 includes a scratchpad memory 515, which may receive external data, memory addresses, and memory control information (write enable, read enable) via one or more buses included in the ALN. PCU 520 includes two or more processor stages, such as SIMD 521 through SIMD 526, and configuration store 528. The processor stages may include ALUs, or SIMDs, as drawn, or any other reconfigurable stages that can process data.

Each stage in PCU 520 may also hold one or more registers (not drawn) for short-term storage of parameters. Short-term storage, for example during one to several clock cycles or unit delays, allows for synchronization of data in the PCU pipeline.

Figure 6:
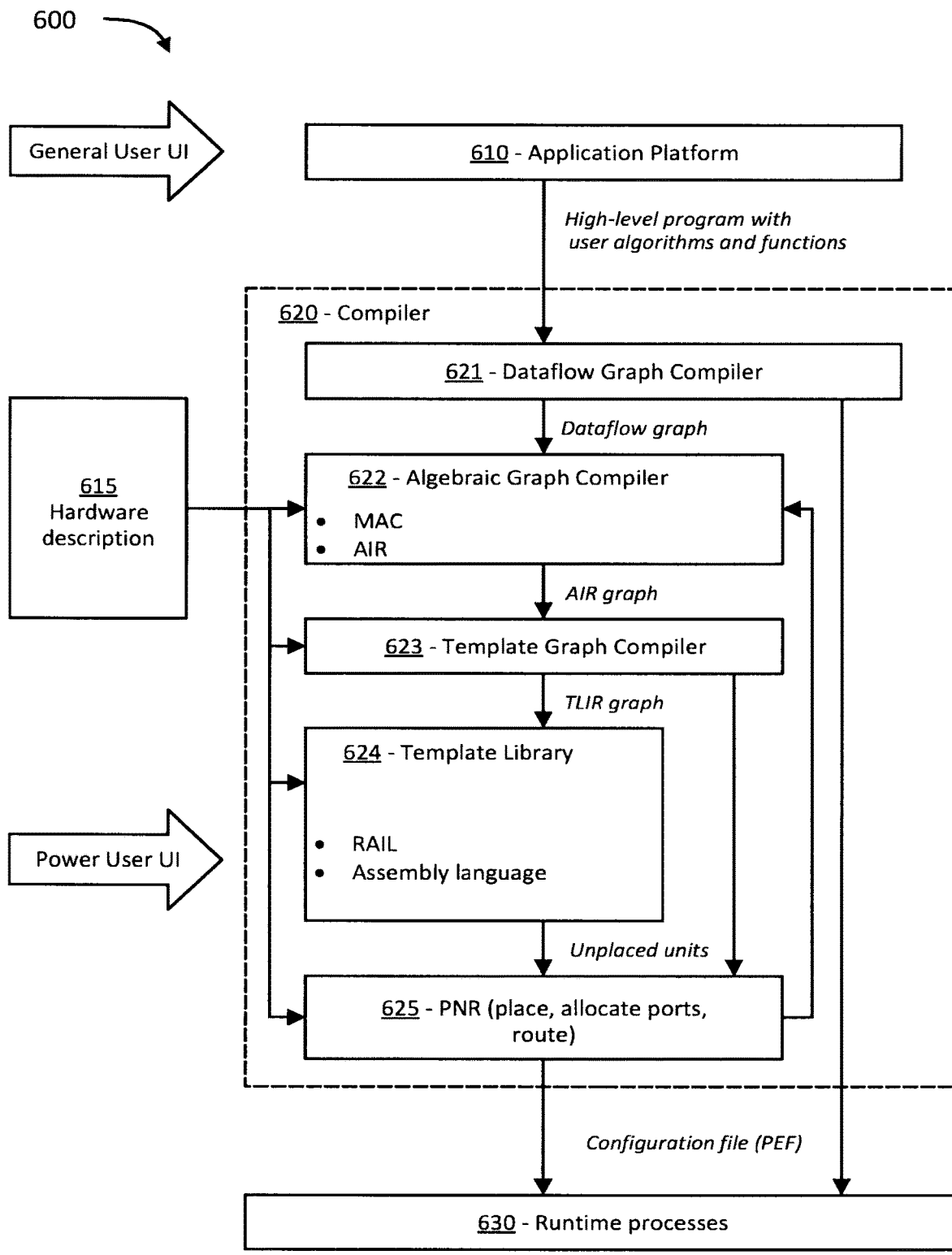
FIG. 6 is a block diagram of a compiler stack implementation suitable for generating a configuration file for a CGR processor.
Figure 9:
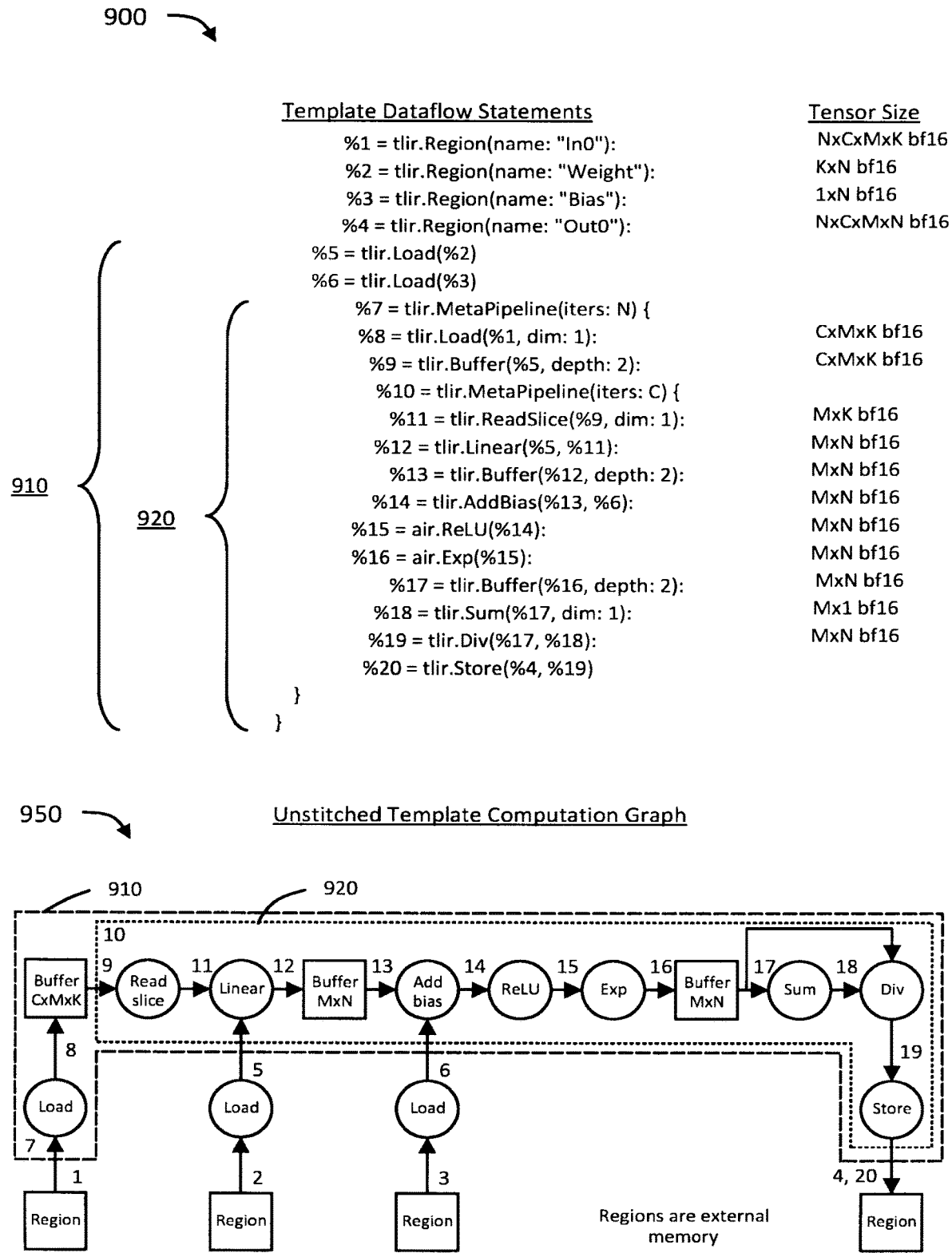
FIG. 9 shows the user program in an example third stage of the compiler stack.

FIG. 6 is a block diagram of a compiler stack 600 implementation suitable for generating a configuration file for a CGR processor. FIGS. 7-11 illustrate various representations of an example user program 700 corresponding to various stages of a compiler stack such as compiler stack 600. As depicted, compiler stack 600 includes several stages to convert a high-level program (e.g., user program 700) with statements 710 that define user algorithms and functions, e.g., algebraic expressions and functions, to configuration data for the CGR units. The example user program 700 depicted in FIG. 7 comprises statements 710 that invoke various PyTorch functions.

Compiler stack 600 may take its input from application platform 610, or any other source of high-level program statements suitable for parallel processing, which provides a user interface for general users. It may further receive hardware description 615, for example defining the physical units in a reconfigurable data processor or CGRA processor. Application platform 610 may include libraries such as PyTorch, TensorFlow, ONNX, Caffe, and Keras to provide user-selected and configured algorithms.

Application platform 610 outputs a high-level program to compiler 620, which in turn outputs a configuration file to the reconfigurable data processor or CGRA processor where it is executed in runtime processes 630. Compiler 620 may include dataflow graph compiler 621, which may handle a dataflow graph, algebraic graph compiler 622, template graph compiler 623, template library 624, and placer and router PNR 625. In some implementations, template library 624 includes RDU abstract intermediate language (RAIL) and/or assembly language interfaces for power users.

Dataflow graph compiler 621 converts the high-level program with user algorithms and functions from application platform 610 to one or more dataflow graphs. The high-level program may be suitable for parallel processing, and therefore parts of the nodes of the dataflow graphs may be intrinsically parallel unless an edge in the graph indicates a dependency. Dataflow graph compiler 621 may provide code optimization steps like false data dependency elimination, dead-code elimination, and constant folding. The dataflow graphs encode the data and control dependencies of the high-level program. Dataflow graph compiler 621 may support programming a reconfigurable data processor at higher or lower-level programming languages, for example from an application platform 610 to C++ and assembly language. In some implementations, dataflow graph compiler 621 allows programmers to provide code that runs directly on the reconfigurable data processor. In other implementations, dataflow graph compiler 621 provides one or more libraries that include predefined functions like linear algebra operations, element-wise tensor operations, non-linearities, and reductions required for creating, executing, and profiling the dataflow graphs on the reconfigurable processors. Dataflow graph compiler 621 may provide an application programming interface (API) to enhance functionality available via the application platform 610.

FIG. 7 shows an example user program 700 in an example first stage of the compiler stack. User program 700 generates a random tensor X1 with a normal distribution in the RandN node. It provides the tensor to a neural network cell that performs a weighing function (in the Linear node) followed by a rectified linear unit (ReLU) activation function, which is followed by a Softmax activation function, for example to normalize the output to a probability distribution over a predicted output class. FIG. 7 does not show the weights and bias used for the weighing function. User program 700 corresponds with computation graph 750.

Algebraic graph compiler 622 may include a model analyzer and compiler (MAC) level that makes high-level mapping decisions for (sub-graphs of the) dataflow graph based on hardware constraints. It may support various application frontends such as Samba, JAX, and TensorFlow/HLO. Algebraic graph compiler 622 may also transform the graphs via autograd and gradient normalization, perform stitching between sub-graphs, interface with template generators for performance and latency estimation, convert dataflow graph operations to AIR operation, perform tiling, sharding (database partitioning) and other operations, and model or estimate the parallelism that can be achieved on the dataflow graphs.

Algebraic graph compiler 622 may further include an arithmetic or algebraic intermediate representation (AIR)

level that translates high-level graph and mapping decisions provided by the MAC level into explicit AIR/Tensor statements 800 (see FIG. 8) and one or more corresponding algebraic graphs 850. Key responsibilities of the AIR level include legalizing the graph and mapping decisions of the MAC, expanding data parallel, tiling, metapipe, region instructions provided by the MAC, inserting stage buffers and skip buffers, eliminating redundant operations, buffers and sections, and optimizing for resource use, latency, and throughput.

FIG. 8 shows the user program 700 in an example second stage of the compiler stack. At this stage, the algebraic graph compiler replaces the Softmax macro by its constituents. The Softmax function is given as $$\frac{e^{(z_i)}}{\sum_{j=1}^{K} e^{(z_j)}}.$$

This function includes an exponential component, a summation, and a division. Thus, algebraic graph compiler 622 replaces the user program statements 710, also shown as computation graph 750, by AIR/Tensor statements 800, also shown as Air/Tensor computation graph 850.

Template graph compiler 623 may translate AIR statements and/or graphs into TLIR statements 900 (see FIG. 9) and/or graphs (graph 950 is shown), optimizing for the target hardware architecture into unplaced variable-sized units (referred to as logical CGR units) suitable for PNR 625. Template graph compiler 623 may allocate metapipelines, such as metapipeline 910 and metapipeline 920, for sections of the template dataflow statements 900 and corresponding sections of unstitched template computation graph 950. Template graph compiler 623 may add further information (name, inputs, input names and dataflow description) for PNR 625 and make the graph physically realizable through each performed step. Template graph compiler 623 may for example provide translation of AIR graphs to specific model operation templates such as for general matrix multiplication (GeMM). An implementation may convert part or all intermediate representation operations to templates, stitch templates into the dataflow and control flow, insert necessary buffers and layout transforms, generate test data and optimize for hardware use, latency, and throughput.

Implementations may use templates for common operations. Templates may be implemented using assembly language, RAIL, or similar. RAIL is comparable to assembly language in that memory units and compute units are separately programmed, but it can provide a higher level of abstraction and compiler intelligence via a concise performance-oriented domain-specific language for CGR array templates. RAIL enables template writers and external power users to control interactions between logical compute units and memory units with high-level expressions without the need to manually program capacity splitting, register allocation, etc. The logical compute units and memory units also enable stage/register allocation, context splitting, transpose slotting, resource virtualization and mapping to multiple physical compute units and memory units (e.g., PCUs and PMUs).

Template library 624 may include an assembler that provides an architecture-independent low-level programming interface as well as optimization and code generation for the target hardware. Responsibilities of the assembler may include address expression compilation, intra-unit resource allocation and management, making a template graph physically realizable with target-specific rules, low-level architecture-specific transformations and optimizations, and architecture-specific code generation.

Figure 10:
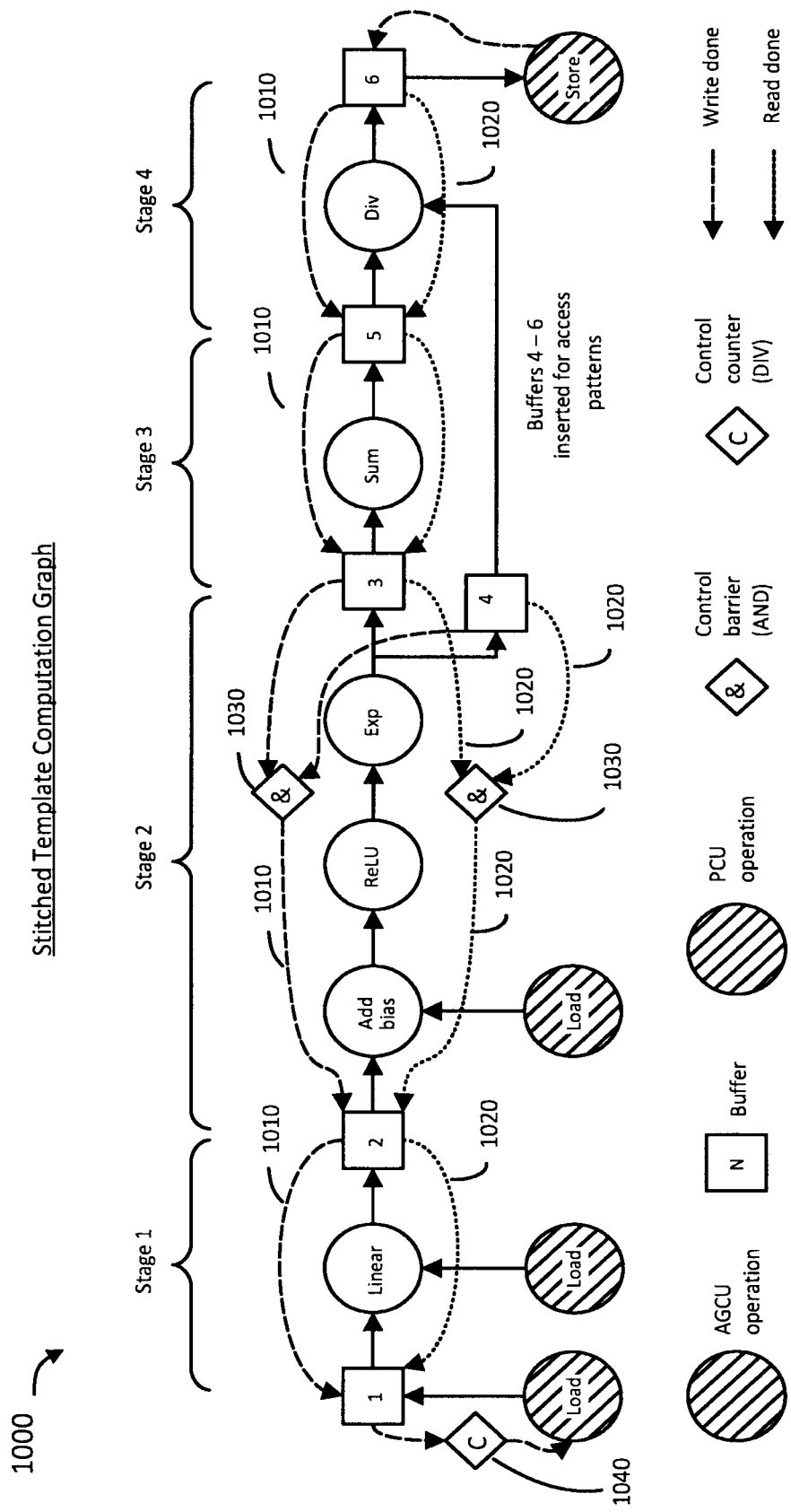
FIG. 10 shows the user program in an example fourth stage of the compiler stack.

FIG. 10 shows the user program 700 in an example fourth stage of the compiler stack. The template graph compiler 623 may also determine the control signals 1010 and 1020, as well as control gates 1030 and 1040 required to enable the CGR units (whether logical or physical) to coordinate dataflow between the CGR units in the CGR array of a CGR processor. This process, sometimes referred to as stitching, produces a stitched template compute graph 1000 with control signals 1010-1020 and control gates 1030-1040. In the example depicted in FIG. 10, the control signals include write done signals 1010 and read done signals 1020, and the control gates include 'AND' gates 1030 and a counting or 'DIV' gate 1040. The control signals and control gates enable coordinated dataflow between the configurable units of CGR processors such as compute units, memory units, and AGCUs.

PNR 625 translates and maps logical (i.e., unplaced physically realizable) CGR units (e.g., the nodes of the logical computation graph 1100 shown in FIG. 11) to a physical layout (e.g., the physical layout 1150 shown in FIG. 11) on the physical level, e.g., a physical array of CGR units in a semiconductor chip. PNR 625 also determines physical data channels to enable communication among the CGR units and between the CGR units and circuits coupled via the TLN; allocates ports on the CGR units and switches; provides configuration data and initialization data for the target hardware; and produces configuration files, e.g., processor-executable format (PEF) files. It may further provide bandwidth calculations, allocate network interfaces such as AGCUs and virtual address generators (VAGs), provide configuration data that allows AGCUs and/or VAGs to perform address translation, and control ALN switches and data routing. PNR 625 may provide its functionality in multiple steps and may include multiple modules (not shown in FIG. 6) to provide the multiple steps, e.g., a placer, a router, a port allocator, and a PEF file generator. PNR 625 may receive its input data in various ways. For example, it may receive parts of its input data from any of the earlier modules (dataflow graph compiler 621, algebraic graph compiler 622, template graph compiler 623, and/or template library 624). In some implementations, an earlier module, such as template graph compiler 623, may have the task of preparing all information for PNR 625 and no other units provide PNR input data directly.

Further implementations of compiler 620 provide for an iterative process, for example by feeding information from PNR 625 back to an earlier module, so that the earlier module can execute a new compilation step in which it uses physically realized results rather than estimates of or placeholders for physically realizable circuits. For example, PNR 625 may feed information regarding the physically realized circuits back to algebraic graph compiler 622.

Memory allocations represent the creation of logical memory spaces in on-chip and/or off-chip memories for data required to implement the dataflow graph, and these memory allocations are specified in the configuration file. Memory allocations define the type and the number of hardware circuits (functional units, storage, or connectivity components). Main memory (e.g., DRAM) may be off-chip memory, and scratchpad memory (e.g., SRAM) is on-chip memory inside a CGR array. Other memory types for which the memory allocations can be made for various access patterns and layouts include cache, read-only look-up tables (LUTs), serial memories (e.g., FIFOs), and register files.

Compiler 620 binds memory allocations to unplaced memory units and binds operations specified by operation nodes in the dataflow graph to unplaced compute units, and these bindings may be specified in the configuration data. In some implementations, compiler 620 partitions parts of a dataflow graph into memory subgraphs and compute subgraphs, and specifies these subgraphs in the PEF file. A memory subgraph may comprise address calculations leading up to a memory access. A compute subgraph may comprise all other operations in the parent graph. In one implementation, a parent graph is broken up into multiple memory subgraphs and exactly one compute subgraph. A single parent graph can produce one or more memory subgraphs, depending on how many memory accesses exist in the original loop body. In cases where the same memory addressing logic is shared across multiple memory accesses, address calculation may be duplicated to create multiple memory subgraphs from the same parent graph.

Compiler 620 generates the configuration files with configuration data (e.g., a bit stream) for the placed positions and the routed data and control networks. In one implementation, this includes assigning coordinates and communication resources of the physical CGR units by placing and routing unplaced units onto the array of CGR units while maximizing bandwidth and minimizing latency.

FIG. 11 shows the logical computation graph 1100 and an example physical layout 1150 of the user program.

A first example of accelerated deep learning is using a deep learning accelerator implemented in a CGRA to train a neural network. A second example of accelerated deep learning is using the deep learning accelerator to operate a trained neural network to perform inferences. A third example of accelerated deep learning is using the deep learning accelerator to train a neural network and subsequently perform inference with any one or more of the trained neural network, information from the trained neural network, and a variant of the same.

Examples of neural networks include fully connected neural networks (FCNNs), recurrent neural networks (RNNs), graph neural networks (GNNs), convolutional neural networks (CNNs), graph convolutional networks (GCNs), long short-term memory (LSTM) networks, autoencoders, deep belief networks, and generative adversarial networks (GANs).

An example of training a neural network is determining one or more weights associated with the neural network, such as by back-propagation in a deep learning accelerator. An example of making an inference is using a trained neural network to compute results by processing input data using the weights associated with the trained neural network. As used herein, the term 'weight' is an example of a 'parameter' as used in various forms of neural network processing. For example, some neural network learning is directed to determining parameters (e.g., through back-propagation) that are usable for performing neural network inferences.

A neural network processes data according to a dataflow graph comprising layers of neurons. Example layers of neurons include input layers, hidden layers, and output layers. Stimuli (e.g., input data) are received by an input layer of neurons and the computed results of the dataflow graph (e.g., output data) are provided by an output layer of neurons. Example hidden layers include rectified linear unit (ReLU) layers, fully connected layers, recurrent layers, graphical network layers, long short-term memory layers, convolutional layers, kernel layers, dropout layers, and pooling layers. A neural network may be conditionally and/or selectively trained. After being trained, a neural network may be conditionally and/or selectively used for inference.

Examples of ICs, or parts of ICs, that may be used as deep learning accelerators, are processors such as central processing unit (CPUs), CGR processor ICs, graphics processing units (GPUs), FPGAs, ASICs, application-specific instruction-set processor (ASIP), and digital signal processors (DSPs). The disclosed technology implements efficient distributed computing by allowing an array of accelerators (e.g., reconfigurable processors) attached to separate hosts to directly communicate with each other via buffers.

Traditionally, Recurrent Neural Networks (RNN) and their variants have been used extensively for NLP. Recently, Transformer models for language understanding have outperformed most RNN models. RNNs work with sequential data, such as, language translation and time-series data. They have been slow to train. Often training is truncated by back propagation in time. Moreover, they suffer from vanishing and exploding gradients and in NLP problems, information from the beginning of a sentence is lost. Long Term Short Term (LSTM) networks promised potential via a hidden state, the memory cell, which allowed information from a previous cell to flow to the current cell while skipping most of current-cell processing. This feature allowed the model to retain information for longer sequences. Unfortunately, LSTMs were even slower to train. Moreover, each word of a sequence is passed individually to the network. Processing is sequential, unable to take advantage of parallel-processing architectures. Attention mechanisms address these limitations by using a global vector; the context vector contains the weighted sum of all hidden states. A Transformer architecture enables parallel processing; it uses attention and no RNNs. The input for the encoder is an entire sentence, not a word, each time. All words of a sentence are passed simultaneously to determine word embedding in the sequence as a vector representation such that words with similar meaning are closer. When the model contains no recurrence or convolution, it is necessary to inject information about the relative or absolute position of the tokens in the sequence. The Transformer model uses an explicit position encoding layer that retains the word's position in the sequence post embedding. After word and position embedding, it is processed by a Multi-head Attention (MHA) block. Typically, a single Encoder layer consists of MHA followed by a Feed Forward Neural Network (FFN). Linear layers are single layers of linear neurons, either static with input delays of 0 or dynamic with delays that are positive. During the forward pass, the linear layer computes the matrix product of the input and weight matrix. The backward pass considers gradients. A Bias layer enables shifting the activation function by addition of a constant, usually considering layer convergence to the statistical mean of outputs. Bias in NNs is analogous to a constant in a linear function that transposes the line by that constant value. FFN comprises two Linear layers with Bias and ReLU activations after the first layer. Additional processing includes Dropout, Layer Normalization, and residual connections. The latter skips connections to allow gradient flow through a network directly, several layers later.

In general, a logistic function is defined by the formula:

$$\text{Logistic}(x) = L/(1+e^{-k(x-x_0)})$$

where, $x_0$ is the x value of the sigmoid's midpoint, L is the curve's maximum value and k is the logistic growth rate of the curve. When L=1, k=1 and $x_0$=0, this function is called a sigmoid:

$$\text{Sigmoid}(x) = 1/(1+e^{-x})$$

Thus, Sigmoid(x)=1−Sigmoid(−x).

In Neural Networks (NN), sigmoid is used as an activation function with output range [0, 1], an S-shaped curve. Sigmoid output is not zero centered, gradient updates range far in different directions, rendering optimization harder. In addition, it has slow convergence, saturates, kills gradients, and contributes to the vanishing gradient problem. For example, small and large values passed through the sigmoid function become values close to zero and one respectively, its gradient approaches zero and learning is slow.

The softmax function (see FIG. 12) is a generalization of the logistic function to multiple dimensions. Often, it is used as the last activation function of an NN to normalize the output of that network to a probability distribution over predicted output classes. This function takes a vector of R real numbers as input, normalizes it into a probability distribution consisting of R probabilities proportional to the exponential of input numbers. Prior to applying softmax, some vector components can be negative, greater than 1 or need not sum to 1. However, after softmax application, each component will be in the interval (0, 1) and components will add up to 1, such that they are interpretable as probabilities.

Thus, softmax regression is a logistic regression that normalizes an input value into a vector of values that follows a probability distribution whose total sums to 1. Output values are in the range [0, 1], avoids binary classification to accommodate several classes or dimensions in the NN model. Unlike binary classification (0 or 1), multiple probabilities occur at the output layer of the NN. In this case, the number of hidden units in the output layer equals the number of classes. For example, consider recognizing cats (class 1), cows (class 2), and horses (class 3) from a given dataset; class 0 for others. The output layer has four activation units (4×1 matrix); each activation unit calculates the probability of its respective class; the sum of all elements is 1. In NNs, softmax maps a non-normalized output to a probability distribution over predicted classes.

Softmax applies the standard exponential function to each element of the input tensor. These values are normalized by dividing by the sum of all exponentials ensuring that all components of the output vector sum to 1. This operation is performed along any tensor dimension; the default is the last dimension.

$$\sigma(z)_i = e^{z_i}/\Sigma_{j=1 \ldots k} e^{z_j}, \, i=1 \ldots k$$

Disclosed Softmax Pipeline

The softmax operation appears as a bottleneck in some applications. It requires four different operations serially before addressing the next input-set. First, the maximum is determined. Then its exponent is computed followed by summation of all exponents. Finally, each input is divided by the sum of all exponents. Let's assume the input tensor is of M×N dimension. Based on the compute unit depth the sharding happens on M dim with M divided by compute unit depth. Considering this sharding the initial design executed with approximately number of sharding*5N delay. Pipelining the input resulted in worst-case pipe stage delay of 3N with observed latency closer to 3.8N per sharded M dimension. Additionally, this pipelined design requires careful placement of compute units to avoid traffic overlap that causes performance degradation. Moreover, pipelining does not prove effective if input data is not large enough in M dim to keep the pipeline full; i.e., a default fixed cost penalty ~5N to fill the pipeline if tensor M is small.

Figure 13:
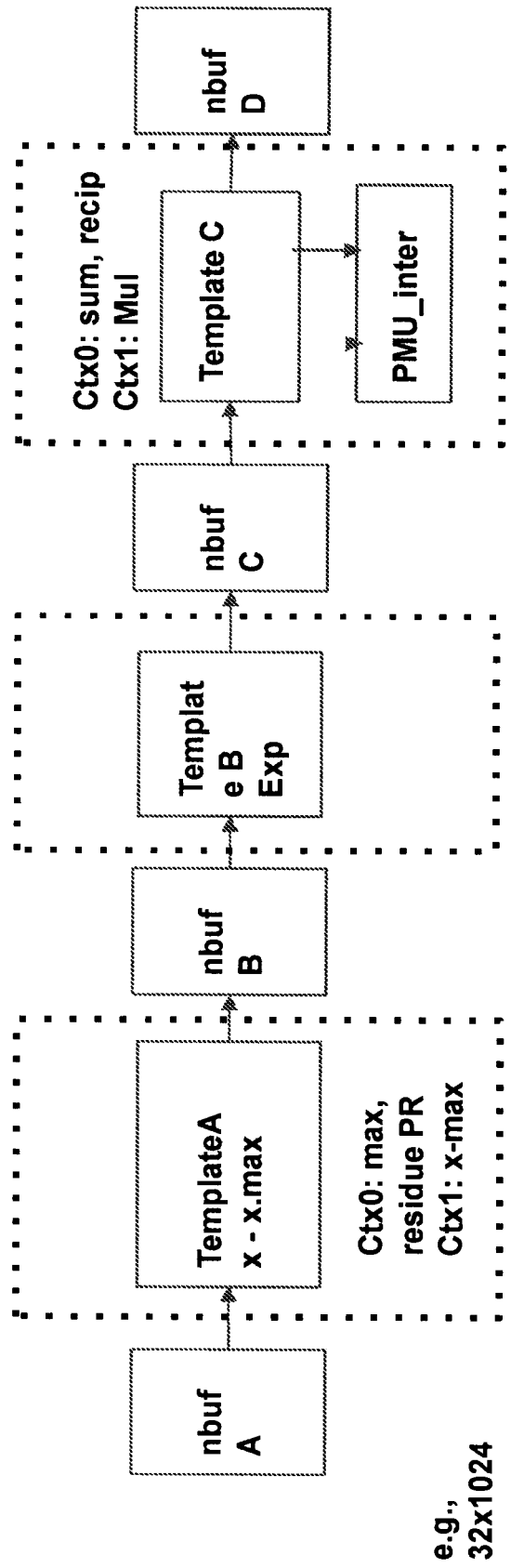
FIG. 13 illustrates the disclosed efficient softmax pipeline.

The improved pipeline design (see FIG. 13) divides the pipeline evenly. Each pipeline stage is a coarse-grained template that can be used to compose other operations. This new design computes maximum (max) and the difference between input and max in the first stage. The second stage performs exponent calculations and the final stage computes the sum-reciprocal combined with the multiply operation. This design requires 3 compute units versus 4 that was previously required; thus, being resource efficient. Each pipeline stage requires 2N latency per sharded M dimension. The absence of multiple compute units with shared fan-in obviates predetermined placement of these compute units. Thus, this new design is PnR (place and route) friendly, ~80% more performant as well as resource efficient. In addition, as this implementation is synthesized from piecewise components, it facilitates parallel-version splits when the tensor M has a large dimension.

Additional Optimization

For gradient calculations based on data collected for accuracy, stochastic rounding does not impact the overall accuracy of the training application. As an alternative, this design adopts Round-to-Nearest-Even (RNE) that doubles throughput.

Additionally, the initial calculation of max is done and stored inside the compute unit's temporary storage and used for the next compute cycle of maxbias. This means the max vector is not stored into any memory unit saving that resource along with reducing the network traffic of reading that back into the next compute cycle. This helps with network congestion in dense graphs leading to possible performance degradation.

Data-Parallel Split

A data-parallel split partitions a batch across multiple RDUs. The model is copied to each RDU, and calculations are synchronized across all RDUs.

Consider an example of softmax at MAC level that is data-parallel split at ARC-AIR level:

MAC: [8, 96, 2048, 2048]→Softmax→[8, 96, 2048, 2048]

After Data-Parallel Split,

ARC-AIR: [8, 12, 2048, 2048]→Softmax $dp_0$ on $RDU_0$→[8, 12, 2048, 2048]
→Softmax $dp_1$ on $RDU_1$→[8, 12, 2048, 2048]
→Softmax $dp_2$ on $RDU_2$→[8, 12, 2048, 2048]
→Softmax $dp_3$ on $RDU_3$→[8, 12, 2048, 2048]
→Softmax $dp_4$ on $RDU_4$→[8, 12, 2048, 2048]
→Softmax $dp_5$ on $RDU_5$→[8, 12, 2048, 2048]
→Softmax $dp_6$ on $RDU_6$→[8, 12, 2048, 2048]
→Softmax $dp_7$ on $RDU_7$→[8, 12, 2048, 2048]

Clauses

The technology disclosed, in particularly, the clauses disclosed in this section, can be practiced as a system, method, or article of manufacture. One or more features of an implementation can be combined with the base implementation. Implementations that are not mutually exclusive are taught to be combinable. One or more features of an implementation can be combined with other implementations. This disclosure periodically reminds the user of these options. Omission from some implementations of recitations that repeat these options should not be taken as limiting the combinations taught in the preceding sections—these recitations are hereby incorporated forward by reference into each of the following implementations.

One or more implementations and clauses of the technology disclosed or elements thereof can be implemented in the form of a computer product, including a non-transitory computer readable storage medium with computer usable program code for performing the method steps indicated. Furthermore, one or more implementations and clauses of the technology disclosed or elements thereof can be implemented in the form of an apparatus including a memory and at least one processor that is coupled to the memory and operative to perform exemplary method steps. Yet further, in another aspect, one or more implementations and clauses of the technology disclosed or elements thereof can be implemented in the form of means for carrying out one or more of the method steps described herein; the means can include (i) hardware module(s), (ii) software module(s) executing on one or more hardware processors, or (iii) a combination of hardware and software modules; any of (i)-(iii) implement the specific techniques set forth herein, and the software modules are stored in a computer readable storage medium (or multiple such media).

The clauses described in this section can be combined as features. In the interest of conciseness, the combinations of features are not individually enumerated and are not repeated with each base set of features. The reader will understand how features identified in the clauses described in this section can readily be combined with sets of base features identified as implementations in other sections of this application. These clauses are not meant to be mutually exclusive, exhaustive, or restrictive; and the technology disclosed is not limited to these clauses but rather encompasses all possible combinations, modifications, and variations within the scope of the claimed technology and its equivalents.

Other implementations of the clauses described in this section can include a non-transitory computer readable storage medium storing instructions executable by a processor to perform any of the clauses described in this section. Yet another implementation of the clauses described in this section can include a system including memory and one or more processors operable to execute instructions, stored in the memory, to perform any of the clauses described in this section.

We disclose the following clauses:

1. A computer-implemented method for conducting softmax computations in a reconfigurable dataflow system, the method comprising:
   computing a maximum value and a difference between the maximum value and input values in a first compute stage;
   performing exponent calculations in a second compute stage; and
   computing a sum and a reciprocal in a third compute stage.

2. The computer-implemented method of clause 1, further including:
   storing the maximum value in a compute unit's temporary storage of the first compute stage and using the stored maximum value in a next compute cycle of the first compute stage.

3. The computer-implemented method of clause 1, wherein:
   the first, second, and third compute stages require first, second, and third compute units in the reconfigurable dataflow system.

4. The computer-implemented method of clause 3, wherein:
   absence of multiple compute units each of the computing, performing, and computing steps with shared fan-in obviates predetermined placement of the first, second, and third compute units when conducting the softmax computations in the reconfigurable dataflow system.

5. The computer-implemented method of clause 1, wherein:
   each of the first, second, and third compute stages requires 2N latency per sharded M dimension of an M*N shape tensor.

6. A non-transitory computer-readable storage medium storing computer program instructions that, when executed on a processor, perform operations comprising:
   computing a maximum value and a difference between the maximum value and input values in a first compute stage;
   performing exponent calculations in a second compute stage; and
   computing a sum and a reciprocal in a third compute stage.

7. The non-transitory computer-readable storage medium of clause 6, further comprising:
   storing the maximum value in a compute unit's temporary storage of the first compute stage and using the stored maximum value in a next compute cycle of the first compute stage.

8. The non-transitory computer-readable storage medium of clause 6, wherein:
   the first, second, and third compute stages require first, second, and third compute units in the reconfigurable dataflow system.

9. The non-transitory computer-readable storage medium of clause 8, wherein:
   absence of multiple compute units each of the computing, performing, and computing steps with shared fan-in obviates predetermined placement of the first, second, and third compute units when conducting the softmax computations in the reconfigurable dataflow system.

10. The non-transitory computer-readable storage medium of clause 6, wherein:
    each of the first, second, and third compute stages requires 2N latency per sharded M dimension of an M*N shape tensor.

11. A system comprising one or more processors coupled to a memory device, the memory device to store computer program instructions that are executable by the one or more processors to perform operations comprising:
    computing a maximum value and a difference between the maximum value and input values in a first compute stage;
    performing exponent calculations in a second compute stage; and
    computing a sum and a reciprocal in a third compute stage.

12. The system of clause 11, further comprising:
    storing the maximum value in a compute unit's temporary storage of the first compute stage and using the stored maximum value in a next compute cycle of the first compute stage.

13. The system of clause 11, wherein:
the first, second, and third compute stages require first, second, and third compute units in the reconfigurable dataflow system.

14. The system of clause 13, wherein:
absence of multiple compute units each of the computing, performing, and computing steps with shared fan-in obviates predetermined placement of the first, second, and third compute units when conducting the softmax computations in the reconfigurable dataflow system.

15. The system of clause 11, wherein:
each of the first, second, and third compute stages requires 2N latency per sharded M dimension of an M*N shape tensor.

FURTHER OR ADDITIONAL CONSIDERATIONS

The technology disclosed can be practiced as a system, method, or article of manufacture. One or more features of an implementation can be combined with the base implementation. Implementations that are not mutually exclusive are taught to be combinable. One or more features of an implementation can be combined with other implementations. This disclosure periodically reminds the user of these options. Omission from some implementations of recitations that repeat these options should not be taken as limiting the combinations taught in the preceding sections—these recitations are hereby incorporated forward by reference into each of the implementations described herein.

Although the description has been described with respect to particular implementations thereof, these particular implementations are merely illustrative, and not restrictive. The description may reference specific structural implementations and methods, and does not intend to limit the technology to the specifically disclosed implementations and methods. The technology may be practiced using other features, elements, methods and implementations. Implementations are described to illustrate the present technology, not to limit its scope, which is defined by the claims. Those of ordinary skill in the art recognize a variety of equivalent variations on the description above.

All features disclosed in the specification, including the claims, abstract, and drawings, and all the steps in any method or process disclosed, may be combined in any combination, except combinations where at least some of such features and/or steps are mutually exclusive. Each feature disclosed in the specification, including the claims, abstract, and drawings, can be replaced by alternative features serving the same, equivalent, or similar purpose, unless expressly stated otherwise.

Although the description has been described with respect to particular implementations thereof, these particular implementations are merely illustrative, and not restrictive. For instance, many of the operations can be implemented in a CGRA system, a System-on-Chip (SoC), application-specific integrated circuit (ASIC), programmable processor, in a programmable logic device such as a field-programmable gate array (FPGA) or a graphics processing unit (GPU), obviating a need for at least part of the dedicated hardware. Implementations may be as a single chip, or as a multi-chip module (MCM) packaging multiple semiconductor dies in a single package. All such variations and modifications are to be considered within the ambit of the present disclosed technology the nature of which is to be determined from the foregoing description.

One or more implementations of the technology or elements thereof can be implemented in the form of a computer product, including a non-transitory computer-readable storage medium with computer usable program code for performing any indicated method steps and/or any configuration file for one or more CGR processors to execute a high-level program. Furthermore, one or more implementations of the technology or elements thereof can be implemented in the form of an apparatus including a memory and at least one processor that is coupled to the memory and operative to perform exemplary method steps, and/or a CGR processor that is operative to execute a high-level program based on a configuration file. Yet further, in another aspect, one or more implementations of the technology or elements thereof can be implemented in the form of means for carrying out one or more of the method steps described herein and/or executing a high-level program described herein. Such means can include (i) hardware module(s); (ii) software module(s) executing on one or more hardware processors; (iii) bit files for configuration of a CGR array; or (iv) a combination of aforementioned items.

Thus, while particular implementations have been described herein, latitudes of modification, various changes, and substitutions are intended in the foregoing disclosures, and it will be appreciated that in some instances some features of particular implementations will be employed without a corresponding use of other features without departing from the scope and spirit as set forth. Therefore, many modifications may be made to adapt a particular situation or material to the essential scope and spirit of the technology disclosed.

What is claimed is:

1. A computer-implemented method for conducting softmax computations in a reconfigurable dataflow system, the method comprising:
computing a maximum value and a difference between the maximum value and input values in a first compute stage;
performing exponent calculations in a second compute stage; and
computing a sum and a reciprocal in a third compute stage.

2. The computer-implemented method of claim 1, further including:
storing the maximum value in a compute unit's temporary storage of the first compute stage and using the stored maximum value in a next compute cycle of the first compute stage.

3. The computer-implemented method of claim 1, wherein:
the first, second, and third compute stages require first, second, and third compute units in the reconfigurable dataflow system.

4. The computer-implemented method of claim 3, wherein:
absence of multiple compute units each of the computing, performing, and computing steps with shared fan-in obviates predetermined placement of the first, second, and third compute units when conducting the softmax computations in the reconfigurable dataflow system.

5. The computer-implemented method of claim 1, wherein:
each of the first, second, and third compute stages requires 2N latency per sharded M dimension of an M*N shape tensor.

6. A non-transitory computer-readable storage medium storing computer program instructions that, when executed on a processor, perform operations comprising:
   computing a maximum value and a difference between the maximum value and input values in a first compute stage;
   performing exponent calculations in a second compute stage; and
   computing a sum and a reciprocal in a third compute stage.

7. The non-transitory computer-readable storage medium of claim 6, further comprising:
   storing the maximum value in a compute unit's temporary storage of the first compute stage and using the stored maximum value in a next compute cycle of the first compute stage.

8. The non-transitory computer-readable storage medium of claim 6, wherein:
   the first, second, and third compute stages require first, second, and third compute units in the reconfigurable dataflow system.

9. The non-transitory computer-readable storage medium of claim 8, wherein:
   absence of multiple compute units each of the computing, performing, and computing steps with shared fan-in obviates predetermined placement of the first, second, and third compute units when conducting the softmax computations in the reconfigurable dataflow system.

10. The non-transitory computer-readable storage medium of claim 6, wherein:
   each of the first, second, and third compute stages requires 2N latency per sharded M dimension of an M*N shape tensor.

11. A system comprising one or more processors coupled to a memory device, the memory device to store computer program instructions that are executable by the one or more processors to perform operations comprising:
   computing a maximum value and a difference between the maximum value and input values in a first compute stage;
   performing exponent calculations in a second compute stage; and
   computing a sum and a reciprocal in a third compute stage.

12. The system of claim 11, further comprising:
   storing the maximum value in a compute unit's temporary storage of the first compute stage and using the stored maximum value in a next compute cycle of the first compute stage.

13. The system of claim 11, wherein:
   the first, second, and third compute stages require first, second, and third compute units in the reconfigurable dataflow system.

14. The system of claim 13, wherein:
   absence of multiple compute units each of the computing, performing, and computing steps with shared fan-in obviates predetermined placement of the first, second, and third compute units when conducting the softmax computations in the reconfigurable dataflow system.

15. The system of claim 11, wherein:
   each of the first, second, and third compute stages requires 2N latency per sharded M dimension of an M*N shape tensor.

* * * * *